United States Patent
Huang et al.

(10) Patent No.: US 12,538,257 B2
(45) Date of Patent: Jan. 27, 2026

(54) COOPERATIVE POSITIONING METHOD AND APPARATUS

(71) Applicant: HUAWEI TECHNOLOGIES CO., LTD., Guangdong (CN)

(72) Inventors: Wei Huang, Shenzhen (CN); Xueru Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 376 days.

(21) Appl. No.: 18/042,778

(22) PCT Filed: Jul. 28, 2021

(86) PCT No.: PCT/CN2021/109005
§ 371 (c)(1),
(2) Date: Feb. 24, 2023

(87) PCT Pub. No.: WO2022/042193
PCT Pub. Date: Mar. 3, 2022

(65) Prior Publication Data
US 2024/0015687 A1    Jan. 11, 2024

(30) Foreign Application Priority Data

Aug. 29, 2020  (CN) .......................... 202010890921.5
Dec. 3, 2020   (CN) .......................... 202011412677.8

(51) Int. Cl.
*H04W 64/00*   (2009.01)
*H04L 5/00*    (2006.01)

(52) U.S. Cl.
CPC ........... *H04W 64/00* (2013.01); *H04L 5/0051* (2013.01)

(58) Field of Classification Search
CPC .... G01S 5/0072; G01S 5/0218; G01S 5/0289; H04L 5/0051; H04W 64/00; H04W 64/006
See application file for complete search history.

(56) References Cited

U.S. PATENT DOCUMENTS

2011/0134781 A1   6/2011  Malnati et al.
2019/0261302 A1*  8/2019  Johansson ................. G01S 5/14
(Continued)

OTHER PUBLICATIONS

3GPP TS 22.071 V16.0.0 (Jul. 2020), 3rd Generation Partnership Project; Technical Specification Group Services and System Aspects; Location Services (LCS); Service description; Stage 1 (Release 16), total 56 pages.
(Continued)

*Primary Examiner* — Timothy X Pham

(57) ABSTRACT

A method includes: a first terminal sends first information to a second terminal. The first information includes a source terminal identifier and a target terminal identifier, and the second terminal determines relative location information between the second terminal and the first terminal in response to the first information. The second terminal sends second information to a third terminal. The second information includes the relative location information between the second terminal and the first terminal, the source terminal identifier, and the target terminal identifier, and the third terminal determines relative location information between the third terminal and the second terminal in response to the second information. There is a line of sight path between the first terminal and the second terminal, and there is a line of sight path between the second terminal and the third terminal.

20 Claims, 19 Drawing Sheets

(56) References Cited

U.S. PATENT DOCUMENTS

| | | | | |
|---|---|---|---|---|
| 2019/0349716 A1* | 11/2019 | Liu | ................... | H04N 7/183 |
| 2023/0198709 A1* | 6/2023 | Priyanto | ............... | H04W 8/005 |
| | | | | 455/456.1 |
| 2023/0213607 A1* | 7/2023 | Dong | .................... | H04W 4/023 |
| | | | | 342/463 |

OTHER PUBLICATIONS

3GPP TR 22.804 V16.3.0 (Jul. 2020), 3rd Generation Partnership Project; Technical Specification Group Services and System Aspects; Study on Communication for Automation in Vertical Domains (Release 16), total 197 pages Liuweiwei, Research on Node Selection Algorithm for Cooperative Localization, School of Microelectronics, Tianjin University, Nov. 2017, total 60 pages.

* cited by examiner

| Source terminal identifier | Target terminal identifier | Preset time information |
|---|---|---|

(a)

| Source terminal identifier | Target terminal identifier | Preset time information | Resource indication information corresponding to a source terminal |
|---|---|---|---|

| Source terminal identifier | Target terminal identifier | Second cooperative terminal identifier | Terminal identifier pair (the source terminal identifier and the first cooperative terminal identifier); first cooperative location; and first cooperative timestamp | Terminal identifier pair (the first cooperative terminal identifier and the second cooperative terminal identifier); second cooperative location; and second cooperative timestamp | Resource indication information corresponding to a second cooperative terminal |
|---|---|---|---|---|---|

First cooperative location information: Terminal identifier pair (source, first cooperative); first cooperative location; and first cooperative timestamp Second cooperative location information: Terminal identifier pair (first cooperative, second cooperative); second cooperative location; and second cooperative timestamp

FIG. 12(b)

COOPERATIVE POSITIONING METHOD AND APPARATUS

CROSS-REFERENCE TO RELATED APPLICATIONS

This application is a National Stage of International Application No. PCT/CN2021/109005, filed on Jul. 28, 2021, which claims priority to Chinese Patent Application No. 202010890921.5, filed on Aug. 29, 2020 and Chinese Patent Application No. 202011412677.8, filed on Dec. 3, 2020, all of which are hereby incorporated by reference in their entireties.

TECHNICAL FIELD

This application relates to the field of communications technologies, and in particular, to a cooperative positioning method and an apparatus.

BACKGROUND

Terminal positioning includes absolute positioning and relative positioning. In a plurality of scenarios, two terminals do not need to know absolute positioning information (for example, absolute coordinates) of each other, but only need to know relative location information (relative distance information or relative angle information) between each other. Compared with absolute positioning, relative positioning occurs only between two terminals, and does not require participation of a third party like a positioning server. Therefore, a signaling interaction process is simpler, and an end-to-end positioning delay can be shorter.

Relative positioning is a single anchor positioning technology. The two terminals perform relative positioning based on multipaths (including a line of sight (line of sight, LOS) path and a non-line of sight (non-line of sight, NLOS)) path between the two terminals. A prerequisite of the relative positioning is that there is a line of sight path between the two terminals.

However, in an actual scenario, there may be no line of sight path between the two terminals that have relative positioning requirements, and relatively accurate relative location information cannot be obtained.

SUMMARY

This application provides a cooperative positioning method and an apparatus, to obtain relatively accurate relative location information when there is no line of sight path between two terminals.

According to a first aspect, this application provides a cooperative positioning method, including: A first terminal sends first information to a second terminal. The first information includes a source terminal identifier and a target terminal identifier, and the second terminal determines relative location information between the second terminal and the first terminal in response to the first information. The second terminal sends second information to a third terminal. The second information includes the relative location information between the second terminal and the first terminal, the source terminal identifier, and the target terminal identifier, and the third terminal determines relative location information between the third terminal and the second terminal in response to the second information. There is a line of sight path between the first terminal and the second terminal, and there is a line of sight path between the second terminal and the third terminal.

In the foregoing technical solution, if there is no line of sight path between a source terminal and a target terminal, a cooperative terminal may assist the source terminal and the target terminal in determining relative location information (or referred to as a relative positioning result) between the source terminal and the target terminal. The cooperative positioning process may include determining relative location information between two terminals that have a line of sight path, and finally determining the relative location information between the source terminal and the target terminal based on the relative location information between the two terminals that have a line of sight path. Because there is a line of sight path between two terminals that perform relative positioning, the two terminals may determine relatively accurate relative location information, and relatively accurate relative location information between the target terminal and the source terminal is determined based on a plurality of pieces of relatively accurate relative location information. There is no need to eliminate a non-line of sight path positioning error between the target terminal and/or the source terminal, so that complexity of the positioning process is reduced.

In a possible design, the first terminal is a source terminal, the second terminal is a cooperative terminal, the third terminal is a target terminal, and the method further includes: The third terminal determines relative location information between the third terminal and the first terminal based on the relative location information between the third terminal and the second terminal and the relative location information between the second terminal and the first terminal. The third terminal sends a third message to the first terminal. The third message includes the relative location information between the third terminal and the first terminal, the source terminal identifier, and the target terminal identifier.

In the foregoing technical solution, there is a line of sight path between the source terminal and the cooperative terminal, and there is a line of sight path between the target terminal and the cooperative terminal. In this case, the cooperative terminal may determine relative location information between the cooperative terminal and the source terminal, and the target terminal determines relative location information between the target terminal and the cooperative terminal. Then, the target terminal accurately determines the relative location information between the target terminal and the source terminal based on the relative location information of the cooperative terminal and the source terminal and the relative location information between the cooperative terminal and the target terminal.

According to a second aspect, this application provides a cooperative positioning method, including: A second terminal receives first information from a first terminal, and determines relative location information between the second terminal and the first terminal in response to the first information. The first information includes a source terminal identifier and a target terminal identifier. The second terminal sends second information to a third terminal. The second information includes the relative location information between the second terminal and the first terminal, the source terminal identifier, and the target terminal identifier. There is a line of sight path between the first terminal and the second terminal, and there is a line of sight path between the second terminal and the third terminal.

In the foregoing technical solution, if there is no line of sight path between a source terminal and a target terminal, a cooperative terminal may assist the source terminal and the target terminal in determining relative location information between the source terminal and the target terminal. The cooperative positioning process may include determining relative location information between two terminals that have a line of sight path, and finally determining the relative location information between the source terminal and the target terminal based on the relative location information between the two terminals that have a line of sight path. Because there is a line of sight path between two terminals that perform relative positioning, the two terminals may determine relatively accurate relative location information, and relatively accurate relative location information between the target terminal and the source terminal is determined based on a plurality of pieces of relatively accurate relative location information. There is no need to eliminate a non-line of sight path positioning error between the target terminal and/or the source terminal, so that complexity of the positioning process is reduced.

In a possible design, the first information further includes relative location information between the first terminal and a fourth terminal, the second information further includes the relative location information between the first terminal and the fourth terminal, and there is a line of sight path between the first terminal and the fourth terminal.

In the foregoing technical solution, the first information sent by the first terminal may further include the relative location information between the first terminal and the fourth terminal that is determined based on the line of sight path. The second terminal may add, to the second information sent to the third terminal, the determined relative location information between the second terminal and the first terminal and the relative location information between the first terminal and the fourth terminal that is obtained from the first information. In this case, the third terminal may obtain the relative location information between the first terminal and the fourth terminal, the relative location information between the first terminal and the second terminal, and relative location information between the third terminal and the second terminal. This helps reduce a delay in the entire positioning process, and quickly determine the relative location information between the source terminal and the target terminal.

In a possible design, the first information further includes preset time information. The preset time information indicates the second terminal to send the second information within a preset time period. In the foregoing technical solution, each terminal in a cooperative terminal group may determine, based on the preset time information, to perform the foregoing relative positioning process in the preset time period, to avoid a problem that each terminal in the cooperative terminal group continuously determines the relative location information between the source terminal and the target terminal.

In a possible design, the first information further includes preset time information. The preset time information indicates whether the second terminal includes the relative location information between the first terminal and the fourth terminal in the second information. In the foregoing technical solution, each terminal in a cooperative terminal group may further determine, based on the preset time information, whether to obtain relative location information in received information, to filter out relative location information that is determined earlier, thereby helping reduce signaling load while reducing a delay.

In a possible design, the first information further includes indication information of a first resource, and the first resource is used to carry a relative positioning reference signal sent by the first terminal. That the second terminal determines relative location information between the second terminal and the first terminal includes: The second terminal measures, on the first resource, the relative positioning reference signal sent by the first terminal, to obtain the relative location information between the second terminal and the first terminal. In the foregoing technical solution, each terminal in a cooperative terminal group broadcasts the relative positioning reference signal only when receiving corresponding information. This helps reduce electric energy of each terminal.

In a possible design, the first information further includes a first terminal identifier. That the second terminal determines relative location information between the second terminal and the first terminal includes: The second terminal determines a first resource based on the first terminal identifier and preset configuration information of a periodic relative positioning reference signal. The first resource is used to carry a relative positioning reference signal sent by the first terminal. The second terminal measures, on the first resource, the relative positioning reference signal sent by the first terminal, to obtain the relative location information between the second terminal and the first terminal. In the foregoing technical solution, each terminal in a cooperative terminal group periodically broadcasts a relative positioning reference signal, to implement relatively frequent or continuous relative positioning between the target terminal and the source terminal.

According to a third aspect, this application provides a cooperative positioning method, including: A first terminal determines first message. The first information includes a source terminal identifier and a target terminal identifier. The first terminal sends the first information to a second terminal. The first information indicates the second terminal to send second information to a third terminal. The second information includes relative location information between the second terminal and the first terminal, the source terminal identifier, and the target terminal identifier. There is a line of sight path between the first terminal and the second terminal, and there is a line of sight path between the second terminal and the third terminal.

According to a fourth aspect, this application provides a cooperative positioning method, including: A third terminal receives second information from a second terminal. The second information includes relative location information between the second terminal and a first terminal, a source terminal identifier, and a target terminal identifier. The third terminal determines relative location information between the third terminal and the second terminal in response to the second information. There is a line of sight path between the first terminal and the second terminal, and there is a line of sight path between the second terminal and the third terminal.

According to a fifth aspect, this application provides a communications apparatus. The communications apparatus may be a terminal, a chip in a terminal, or a system on chip. The communications apparatus includes a processor and a memory. The processor is coupled to the memory, the memory is configured to store computer program instructions, and when the processor executes the computer program instructions, the communications apparatus is enabled to perform the following steps: receiving first information from the first terminal, determining relative location information between the second terminal and the first terminal in response to the first information, and sending second information to a third terminal.

According to a sixth aspect, this application provides a communications apparatus. The communications apparatus includes a processing unit and a communications unit. The processing unit is configured to: control the communications unit to receive first information from a first terminal, and determine relative location information between the apparatus and the first terminal in response to the first information. The first information includes a source terminal identifier and a target terminal identifier. The processing unit is further configured to control the communications unit to send second information to a third terminal. The second information includes the relative location information between the apparatus and the first terminal, the source terminal identifier, and the target terminal identifier. There is a line of sight path between the first terminal and the apparatus, and there is a line of sight path between the apparatus and the third terminal.

According to a seventh aspect, a computer-readable storage medium is provided. The computer-readable storage medium stores instructions. When the instructions are run on a computer, the computer may be enabled to perform the method in any design of the second aspect to the fourth aspect.

According to an eighth aspect, a computer program product including instructions is provided. When the computer program product runs on a computer, the computer may perform the method in any design of the second aspect to the fourth aspect.

According to a ninth aspect, a chip is provided. The chip includes a processor. When the processor executes instructions, the processor is configured to perform the method in any design of the second aspect to the fourth aspect. The instructions may be from a memory inside the chip, or may be from a memory outside the chip. Optionally, the chip further includes an input/output circuit.

For technical effects brought by any design in the third aspect to the ninth aspect, refer to technical effects brought by the foregoing corresponding methods. Details are not described herein again.

BRIEF DESCRIPTION OF DRAWINGS

FIG. 7 is a schematic diagram of a format of a group of cooperative positioning requests according to this application;

DESCRIPTION OF EMBODIMENTS

The following describes in detail embodiments of this application with reference to the accompanying drawings.

Existing vertical industries including vehicle to everything, intelligent driving, indoor navigation and positioning, a smart factory, intelligent warehousing, and the like have high requirements for high-precision positioning. In addition to these vertical industries, consumer terminal devices also have new requirements for high-precision positioning, including object positioning and tracking, precise data transmission, smart payment, smart push, a smart key, and the like.

In the Rel-17 NR Positioning SI (study item, SI) of the 3GPP RAN #86 meeting, objectives are defined as follows: In a general commercial scenario, positioning precision meets submeter-level positioning precision, and a positioning delay is 100 ms. In the industrial internet of things (industrial internet of things, IIOT), the positioning precision needs to meet 20 cm, and the positioning delay needs to meet 10 ms. Based on this requirement, the 3GPP standard actively promotes standardization, including a radio access technology dependent positioning (radio access technology (RAT) dependent positioning) based on a 3GPP cellular network, a global navigation satellite system (global navigation satellite system, GNSS), and a positioning technology based on a non-3GPP terrestrial network, for example, wireless fidelity (wireless fidelity, Wi-Fi) positioning, Bluetooth positioning, terrestrial beacon system (terrestrial beacon system, TBS) positioning, ultra wideband (ultra wideband, UWB) positioning, and hybrid positioning technologies.

Figure 1:
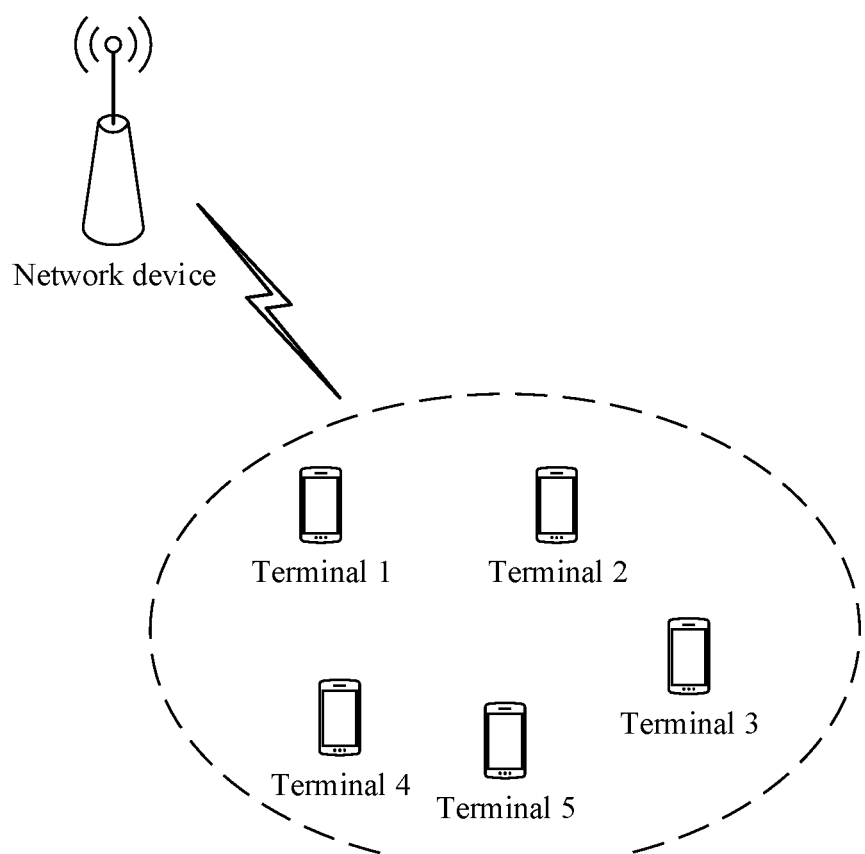
FIG. 1 is a schematic diagram of a cooperative positioning system architecture according to this application.

FIG. 1 is an example of a diagram of a relative positioning system architecture to which an embodiment of this application is applicable. The system architecture includes a plurality of terminals. For example, the plurality of terminals include a terminal 1 to a terminal 5.

The terminal (terminal) may also be referred to as a terminal device, user equipment (user equipment, UE), a mobile station (mobile station, MS), a mobile terminal (mobile terminal, MT), or the like. The terminal may be a mobile phone (mobile phone), a tablet computer (Pad), a computer having radio transmitting and receiving functions, a virtual reality (Virtual Reality, VR) terminal, an augmented reality (Augmented Reality, AR) terminal, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. A specific technology and a specific device form used by the terminal are not limited in this embodiment of this application.

In addition, the architectural diagram of the system may further include a network device. The network device may be a base station (base station), an evolved NodeB (evolved NodeB, eNodeB), a transmission reception point (transmission reception point, TRP), a next generation NodeB (next generation NodeB, gNB) in a 5G mobile communications system, a base station in a future mobile communications system or an access point (access point, AP) in a Wi-Fi system, Bluetooth or an ultra-wideband (ultra-wideband, UWB) anchor, or the like. A specific technology and a specific device form used by the network device are not limited in this embodiment of this application.

Figure 2:
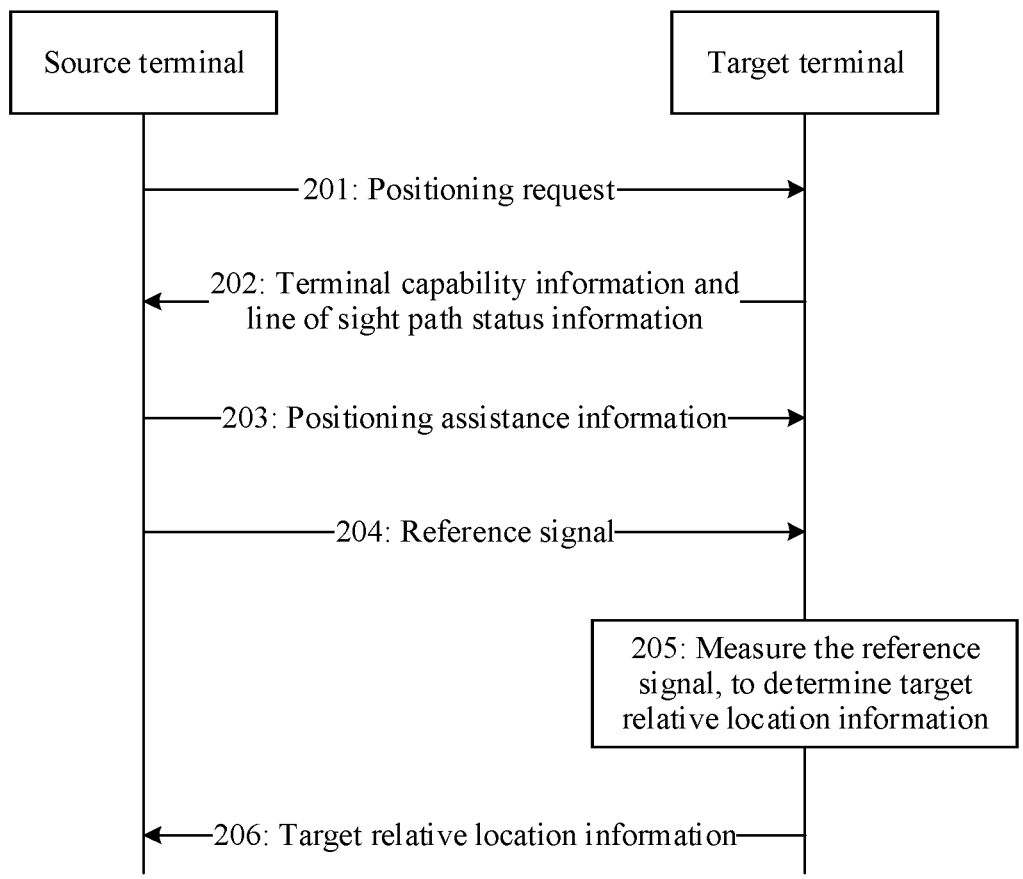
FIG. 2 is a schematic flowchart of a relative positioning method according to this application.

As shown in FIG. 1, any terminal (which may be referred to as a source terminal) and another terminal (which may be referred to as a target terminal) of the plurality of terminals may determine relative location information (which may be referred to as target relative location information) between the source terminal and the target terminal based on a relative positioning process shown in FIG. 2 as an example.

For example, the source terminal and the target terminal may be respectively the terminal 1 and the terminal 3 in FIG. 1, and the target relative location information is, for example, relative angle information and relative distance information between the terminal 1 and the terminal 3.

The relative positioning process is as follows.

Step 201: The source terminal sends a positioning request to the target terminal.

Step 202: In response to the positioning request, the target terminal determines whether there is a line of sight path between the target terminal and the source terminal, generates line of sight path status information, and sends terminal capability information and the line of sight path status information as one message to the source terminal.

The line of sight path status information is obtained by the target terminal by measuring a reference signal sent by the source terminal, and the line of sight path status information is used to indicate whether there is a line of sight path between the target terminal and the source terminal. For example, the line of sight path status information may be represented by using one bit. If a value of the bit is 1, it indicates that there is a line of sight path between the target terminal and the source terminal, and if the value of the bit is 0, it indicates that there is no line of sight path between the target terminal and the source terminal.

When determining whether there is a line of sight path between the target terminal and the source terminal, the target terminal may specifically determine based on a receiver autonomous integrity monitoring (receiver autonomous integrity monitoring, RAIM) algorithm or a random sample consensus (random sample consensus, RANSAC) algorithm in the conventional technology. For example, if the target terminal determines that energy on first-arrival paths on different antenna units on a polarized antenna meets an energy consistency requirement, and first-arrival paths on different antenna units on a vertical polarized antenna also meet a phase consistency requirement, it is determined that there is a line of sight path between the target terminal and the source terminal. Otherwise, it is determined that there is no line of sight path (or only a non-line of sight path) between the target terminal and the source terminal.

In addition, the target terminal may further separately send the line of sight path status information to the source terminal, or report the line of sight path status information as a part of the terminal capability information to the source terminal.

Step 203: The source terminal sends positioning assistance information to the target terminal if the source terminal determines, based on the line of sight path status information and the terminal capability information, that a relative positioning condition is met between the source terminal and the target terminal.

For example, the relative positioning condition includes: 1. There is at least one line of sight path between the source terminal and the target terminal, and the target terminal or the source terminal may measure a time of arrival (time of arrival, TOA) or a round trip time (round trip time, RTT) based on a distinguished line of sight path. 2. At least one of the source terminal and the target terminal has a multi-antenna capability (having at least three physical antennas) or a virtual multi-antenna capability (supporting subcarrier-based carrier phase measurement), and the target terminal may perform estimation on an angle of arrival (angle of arrival, AoA) or an angle of departure (angle of departure, AoD), and perform relative positioning together with a TOA on a line of sight path.

The positioning assistance information includes resource indication information corresponding to the source terminal. The resource indication information corresponding to the source terminal is used to indicate a time-frequency resource for sending a reference signal by the source terminal. The reference signal may be used by the target terminal to measure and determine the relative location information between the target terminal and the source terminal. The reference signal may be referred to as a relative positioning reference signal, a reference signal, a positioning reference signal, a positioning measurement reference signal, or the like.

The reference signal is, for example, a positioning reference signal (positioning reference signal, PRS), a channel state information-reference signal (channel state information-reference signal, CSI-RS), or a time-frequency domain tracking reference signal (time-frequency tracking signal, TRS).

Step 204: The source terminal sends the reference signal to the target terminal.

Step 205: The target terminal measures the reference signal from the source terminal on a corresponding time-frequency resource based on the resource indication information of the reference signal of the source terminal in the positioning assistance information, to determine the target relative location information.

Step 206: The target terminal sends the target relative location information to the source terminal.

In the foregoing relative positioning process, if there is no line of sight path between the source terminal and the target terminal, a non-line of sight path positioning error needs to be eliminated. Generally, non-line of sight path positioning error elimination not only involves a highly complex error elimination and/or suppression algorithm, but also usually requires statistics information measured for a plurality of times. Therefore, elimination or suppression performance cannot be ensured, that is, relatively accurate relative position information cannot be obtained.

Therefore, this application provides a cooperative positioning method. When there is no line of sight path between the source terminal and the target terminal, a cooperative terminal group is established. The cooperative terminal group includes the source terminal, the target terminal, and N cooperative terminals, and N is greater than or equal to 1.

The N cooperative terminals are configured to assist the source terminal and the target terminal in determining the target relative location information, and ensure accuracy of the target relative location information without performing a highly complex non-line of sight path positioning error elimination algorithm.

For example, as shown in FIG. 1, the terminal 1 to the terminal 5 form the cooperative terminal group, the source terminal and the target terminal are respectively the terminal 1 and the terminal 3, and there is no line of sight path between the terminal 1 and the terminal 3. In this case, one or more of the terminal 2, the terminal 4, and the terminal 5 may be used as the cooperative terminal to assist the terminal 1 and the terminal 3 in determining the target relative location information.

The source terminal, the target terminal, and the cooperative terminal in the cooperative terminal group may perform a cooperative positioning process based on different communications network protocols. Specifically, if the network device is a base station, the terminals in the cooperative terminal group may be located within or outside coverage of the base station, and the base station may allocate or pre-allocate a time-frequency resource to the cooperative terminal group. The source terminal, the target terminal, and the cooperative terminal perform the cooperative positioning process based on the time-frequency resource allocated or pre-allocated by the base station. Further, if the terminals in the cooperative terminal group are located outside the coverage of the base station, each terminal in the cooperative terminal group may independently perform the cooperative positioning process without participation of the base station that acts as the network device.

If the network device is an AP, the terminals in the cooperative terminal group may be located within or outside coverage of the AP, and the AP may pre-allocate or pre-contend for a time-frequency resource to the cooperative terminal group. The source terminal, the target terminal, and the cooperative terminal perform the cooperative positioning process based on the time-frequency resource pre-allocated or pre-contended by the AP. Further, if the terminals in the cooperative terminal group are located outside coverage of the AP, each terminal in the cooperative terminal group may independently perform the cooperative positioning process without participation of the AP.

If the network device is a Bluetooth gateway or a UWB anchor, the terminals in the cooperative terminal group may be located within or outside coverage of the Bluetooth gateway or the UWB anchor, and the Bluetooth gateway or the UWB anchor may pre-allocate a time-frequency resource to the cooperative terminal group. The source terminal, the target terminal, and the cooperative terminal perform the cooperative positioning process based on the time-frequency resource pre-allocated by the Bluetooth gateway or the UWB anchor. Further, if the terminals in the cooperative terminal group are located outside the coverage of the Bluetooth gateway or the UWB anchor, each terminal in the cooperative terminal group may independently perform the cooperative positioning process without participation of the Bluetooth gateway or the UWB anchor.

With reference to FIG. 1, this application provides an example of system architecture diagrams in two specific scenarios.

Figure 3:
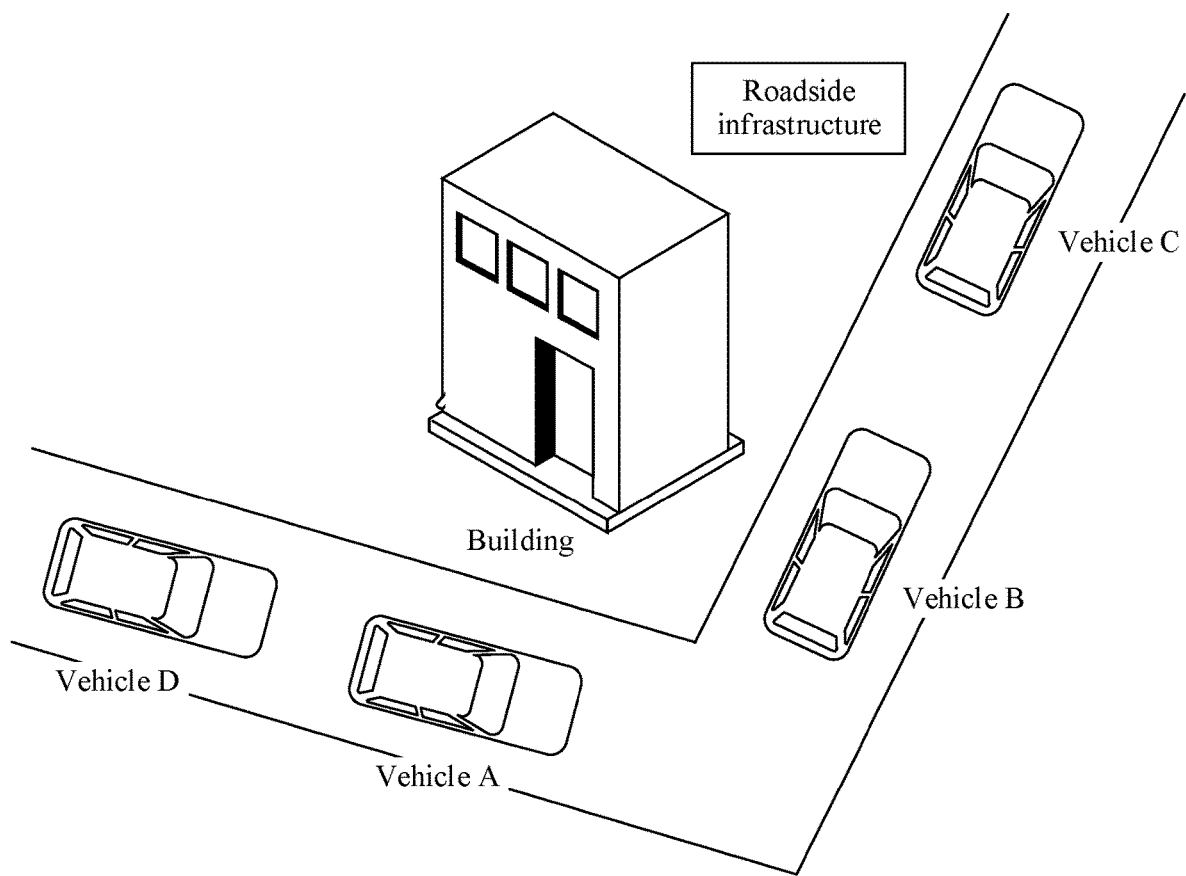
FIG. 3 is a diagram of a system architecture in a V2X scenario according to this application.

FIG. 3 is a diagram of a system architecture in a vehicle to everything (vehicle to everything, V2X) scenario according to this application. A terminal may be a wireless terminal in self driving, for example, a vehicle-mounted terminal, or may be user equipment handheld by a user in a vehicle, for example, a mobile phone or a tablet computer, or may be a roadside infrastructure. Communication between a terminal in a vehicle and a roadside infrastructure is equivalent to communication between the vehicle and the roadside infrastructure. The terminal in the vehicle may be referred to as a vehicle for short.

For example, a source terminal is a vehicle A, and a target terminal is a roadside infrastructure. In other words, the terminal 1 and the terminal 3 in FIG. 1 are respectively corresponding to the vehicle A and the roadside infrastructure in FIG. 3.

There is no line of sight path between the vehicle A and the roadside infrastructure due to building blocking. In this application, a cooperative terminal group may be first established, and then target relative location information is determined based on a cooperative terminal in the cooperative terminal group.

When the cooperative terminal group is established, specifically, the vehicle A may broadcast a networking request, and a vehicle that receives the networking request determines whether a networking condition is met between the vehicle and the vehicle A, and if yes, sends a networking response to the vehicle A. Similarly, the roadside infrastructure receives the networking request, determines that a networking condition is met between the roadside infrastructure and the vehicle A, and sends a networking response to the vehicle A. In this way, the vehicle A, a vehicle B, a vehicle C, a vehicle D, and the roadside infrastructure form a cooperative terminal group.

In the cooperative terminal group, there is a line of sight path between the vehicle A and the vehicle B, and between the vehicle B and the roadside infrastructure. The vehicle B may be used as a cooperative terminal between the vehicle A and the roadside infrastructure, and is configured to assist the vehicle A and the roadside infrastructure in determining target relative location information.

Figure 4:
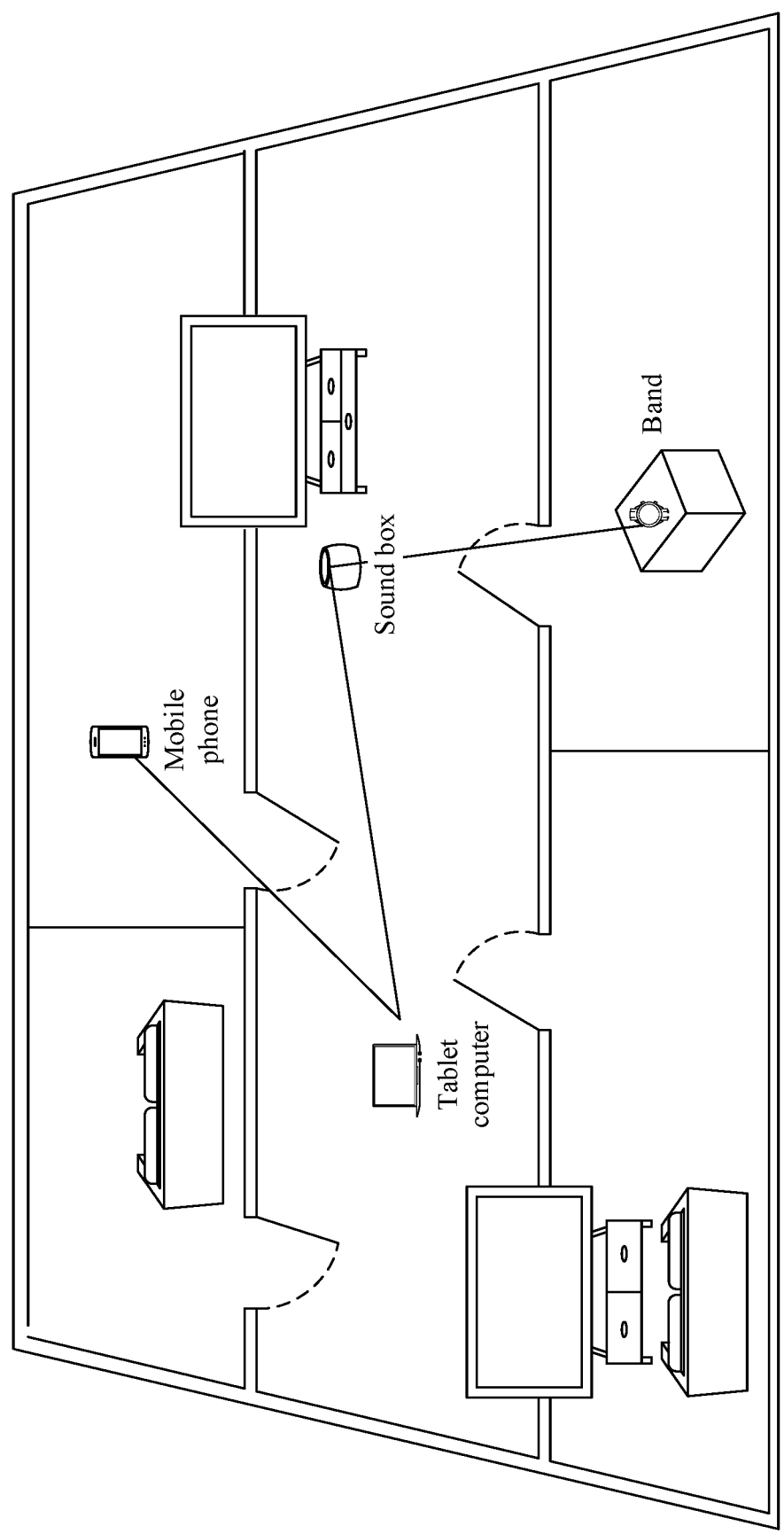
FIG. 4 is a diagram of a system architecture in a home scenario according to this application.

FIG. 4 is a diagram of a system architecture in a home scenario according to this application. A terminal may be any device that can perform wireless communication in a home, for example, a mobile phone, a computer, a headset, a band, a sound box, or a television. A network device may be an AP. The AP may directly form a cooperative terminal group by using the devices in the home scenario.

A user may search for another device by using the mobile phone. For example, a source terminal is the mobile phone, and a target terminal is the band. That is, the terminal 1 and the terminal 3 in FIG. 1 are respectively corresponding to the mobile phone and the band in FIG. 4.

There is no line of sight path between the phone and the band due to wall and/or furniture blocking. In the cooperative terminal group, there is a line of sight path between the mobile phone and the tablet computer, between the tablet computer and the sound box, and between the sound box and the band. The tablet computer and the sound box may be used as cooperative terminals between the mobile phone and the band, and are configured to assist the mobile phone and the band in determining target relative position information.

In addition, this application is further applicable to another scenario. For example, in a supermarket scenario, the terminal may be any device that can perform wireless communication and that is disposed in the supermarket, or may be a shelf attached with a communication label (for example, a radio frequency identification (radio frequency identification, RFID) label). The network device may be an AP, and the AP may directly form a cooperative terminal group by using communication labels on all shelves in the supermarket. The user may search for goods by using the mobile phone. The mobile phone determines, based on a user instruction, target relative location information between the mobile phone and to-be-searched goods. The communication label on the shelf may be used as the cooperative terminal.

For another example, in a field positioning (including field rescue) scenario, a terminal may be a mobile phone of a user, and a user A, a user B, and a user C are respectively corresponding to a mobile phone A, a mobile phone B, and a mobile phone C. The mobile phone A, the mobile phone B, and the mobile phone C form a cooperative terminal group. For example, none of the mobile phone A, the mobile phone B, and the mobile phone C has network coverage. The mobile phone A, the mobile phone B, and the mobile phone C each may determine, based on a parameter set by a system by default, a time-frequency resource for broadcasting a reference signal. When the user A needs to determine relative location information between the user A and the user C that is far away from the user A or that has no line of sight path, the mobile phone A determines, based on a user instruction, target relative location information between the mobile phone A and the mobile phone C by using a cooperative positioning method. The mobile phone B may be used as a cooperative terminal.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

Based on different quantities of cooperative terminals, network topologies, and application scenarios, this application provides two cooperative positioning implementations. In an implementation 1, target relative location information between a source terminal and a target terminal is determined by using one cooperative terminal. In an implementation 2, target relative location information between a source terminal and a target terminal is determined by using a plurality of cooperative terminals. Details are as follows.

Implementation 1

For example, with reference to FIG. 1, it is assumed that there is no line of sight path between the terminal 1 and the terminal 3, and there is a line of sight path between the terminal 1 and the terminal 2 and between the terminal 2 and the terminal 3. The terminal 2 may be used as a cooperative terminal, and is configured to assist the terminal 1 and the terminal 3 in determining target relative position information. It should be understood that a cooperative positioning path is the terminal 1→the terminal 2→the terminal 3. In addition, there may be one or more cooperative positioning paths between the terminal 1 and the terminal 2. For example, the terminal 4 may also be used as a cooperative terminal, and another cooperative positioning path is specifically the terminal 1→the terminal 4→the terminal 3. For one or more cooperative positioning paths between the terminal 1 and the terminal 3, refer to a topology relationship diagram of a terminal in a first cooperative positioning process shown in FIG. 5 as an example.

For ease of description, in this application, relative location information between a source terminal and a cooperative terminal may be referred to as first relative location information, and relative location information between the cooperative terminal and a target terminal may be referred to as second relative location information.

Figure 6:
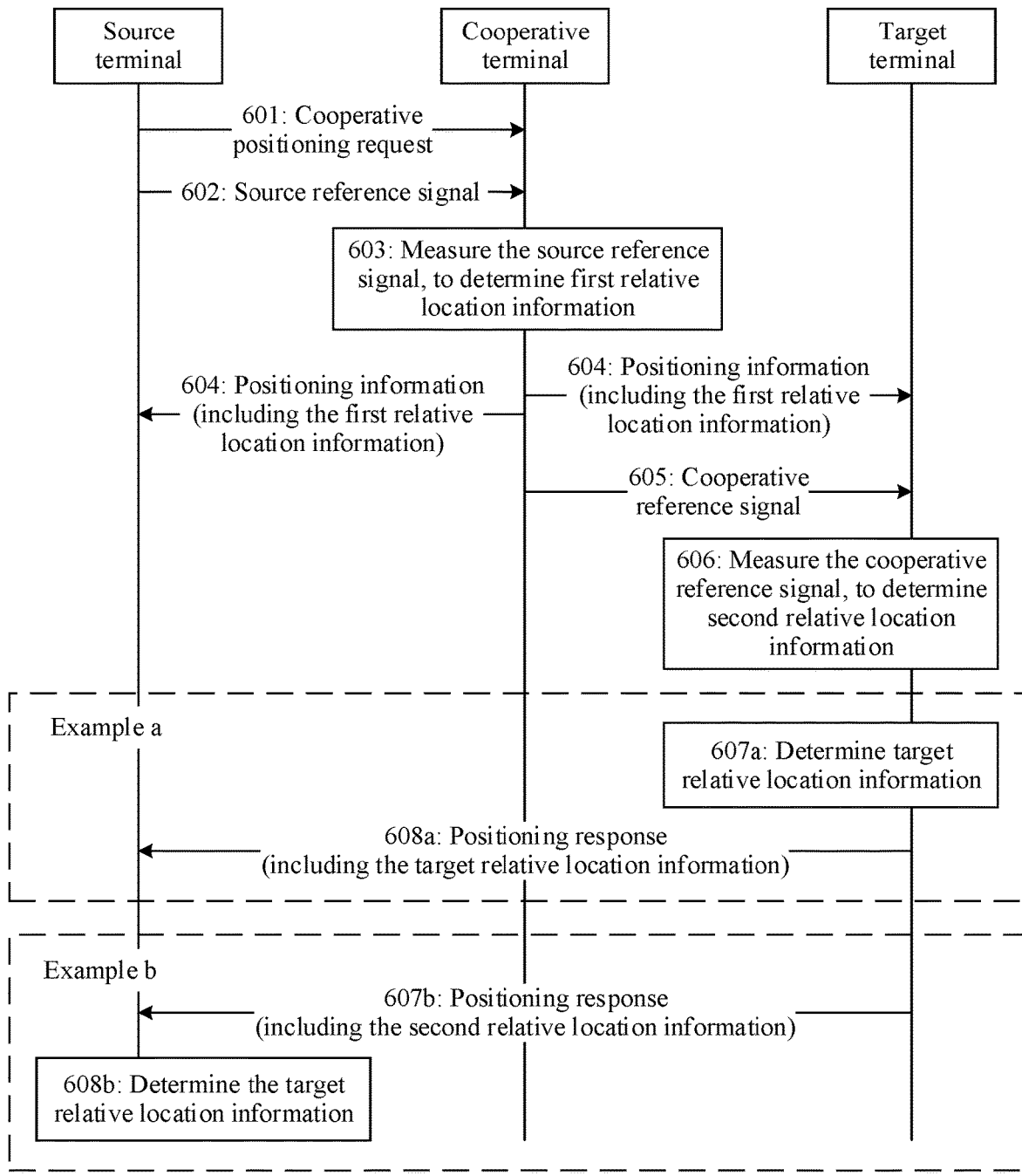
FIG. 6 is a schematic flowchart of a first cooperative positioning method according to this application.

FIG. 6 is a schematic flowchart of a first cooperative positioning method according to an embodiment of this application. The process is as follows.

Step 601: A source terminal broadcasts a cooperative positioning request.

(a) in FIG. 7 is an example schematic diagram of a format of the first cooperative positioning request according to this application. The cooperative positioning request includes a source terminal identifier and a target terminal identifier. The source terminal identifier is a terminal identifier of a source terminal, and the target terminal identifier is a terminal identifier of a target terminal. The terminal identifier may be identity information used to identify the terminal, for example, an internet protocol (internet protocol, IP) address, a product serial number (serial number, SN), or terminal identifiers pre-negotiated by terminals in a cooperative terminal group.

The source terminal identifier and the target terminal identifier in the cooperative positioning request may be used as indication information to indicate a cooperative terminal to assist the source terminal and the target terminal in determining target relative location information.

The cooperative positioning request may further include preset time information. There are at least three examples below.

Example 1: The preset time information in the cooperative positioning request may be a start timestamp. The start timestamp is a timestamp at which the source terminal sends the cooperative positioning request to the cooperative terminal. The start timestamp and first preset duration jointly indicate a start time and an end time of the cooperative positioning process. Duration of the entire cooperative positioning process cannot exceed the first preset duration. For example, if the source terminal sends the cooperative positioning request to the cooperative terminal at a moment t0, the cooperative positioning request sent by the source terminal to the cooperative terminal includes the moment t0. Further, the source terminal may preset the first preset duration to T0 according to a requirement, that is, the source terminal accepts only positioning information broadcast by another terminal within t0 to t0+T0. The cooperative terminal performs the cooperative positioning process from receiving the cooperative positioning request to the moment (t0+T0). In this example, a moment at which the cooperative terminal receives the cooperative positioning request may be a moment t0+TOA.

Example 2: The preset time information in the cooperative positioning request may be a first time period, and the cooperative terminal performs the cooperative positioning process in the first time period after receiving the cooperative positioning request. For example, the cooperative positioning request includes a T1 time period, and a moment at which the cooperative terminal receives the cooperative positioning request is a moment t1. In this case, the cooperative terminal performs the cooperative positioning process from the moment t1 to a moment (t1+T1).

In the foregoing example 1 and example 2, that the cooperative terminal performs the cooperative positioning process may specifically include: The cooperative terminal sends positioning information and/or sends a cooperative reference signal. For details, refer to description in the following embodiments.

Example 3: The preset time information in the cooperative positioning request may be a second time period. The cooperative terminal may store a plurality of pieces of relative location information, and each piece of relative location information corresponds to a respective timestamp. In this case, the cooperative terminal may determine, from the plurality of pieces of relative location information, relative location information that meets a time-effective condition, and then include the relative location information that meets the time-effective condition in the positioning information, that meeting the time-effective condition may be that a corresponding timestamp is within a range of the second time period from a moment at which the cooperative terminal receives the cooperative positioning request to the moment. For example, the cooperative positioning request includes a T2 time period, and a moment at which the cooperative terminal receives the cooperative positioning request is a moment t2. The cooperative terminal determines to include, in the positioning information, relative location information that is obtained by measuring the timestamp between a moment (t2−T2) and the moment t2 or that is received by broadcasting.

Step 602: The source terminal broadcasts a source reference signal.

In this application, a reference signal broadcast by the source terminal may be referred to as the source reference signal for short.

In an implementation, the source terminal determines, based on system or higher layer preset configuration information, a time-frequency resource used to periodically broadcast the source reference signal, and periodically broadcasts the source reference signal on the time-frequency resource.

The preset configuration information includes resource indication information corresponding to each terminal in the cooperative terminal group, and the resource indication information corresponding to each terminal is used to indicate a time-frequency resource used by the terminal to broadcast a reference signal. Specifically, the source terminal determines, based on the source terminal identifier in the preset configuration information, the resource indication information corresponding to the source terminal, determines, based on the resource indication information corresponding to the source terminal, the time-frequency resource used by the source terminal to broadcast the source reference signal, and then broadcasts the source reference signal on the determined time-frequency resource.

The preset configuration information may be generated by a network device or generated by a master terminal or a head terminal in the cooperative terminal group. The master terminal or the head terminal may be a source terminal or another terminal in the cooperative terminal group.

Figure 5:
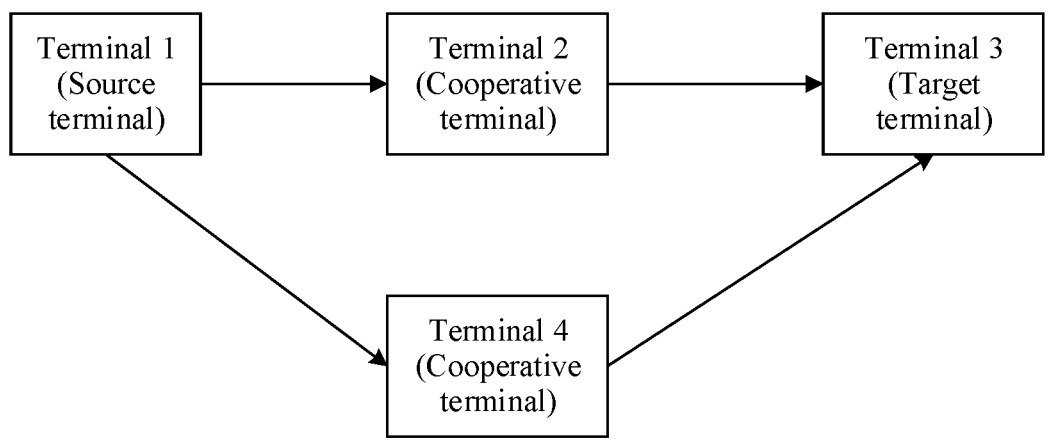
FIG. 5 is a topology relationship diagram of terminals in a first cooperative positioning process according to this application.

With reference to FIG. 1 and FIG. 5, for example, the network device generates the preset configuration information. The preset configuration information includes resource indication information respectively corresponding to the terminal 1 to the terminal 5. The terminal 1 receives the preset configuration information from the network device, determines, from the preset configuration information, resource indication information 1 corresponding to the terminal 1, determines a time-frequency resource 1 based on the resource indication information 1, and then broadcasts the source reference signal on the time-frequency resource 1.

In a scenario in which positioning between terminals needs to be relatively frequent or continuous and the terminals do not need to consider a power consumption factor, the foregoing implementation in which the source terminal periodically broadcasts the source reference signal may be used. For example, in the foregoing V2X scenario, the vehicle A may not need to consider a power consumption factor of the vehicle A, and continuously broadcast the source reference signal in real time, so that the roadside infrastructure or another vehicle learns a relative location with the vehicle A in real time.

In another implementation, the source terminal aperiodically broadcasts the source reference signal. Specifically, the network device or the master terminal may pre-configure a resource pool for the cooperative terminal group. The master terminal may be the source terminal or another terminal in the cooperative terminal group. When the source terminal needs to broadcast the source reference signal, the source terminal selects (or contends for or determines) a time-frequency resource from the resource pool, and broadcasts the source reference signal on the time-frequency resource.

With reference to FIG. 1 and FIG. 5, for example, the network device pre-configures a resource pool for the cooperative terminal group, and the terminal 1 selects the time-frequency resource 1 from the resource pool, and broadcasts the source reference signal on the time-frequency resource 1.

In a scenario in which the terminals in the cooperative terminal group perform burst cooperative positioning, the foregoing implementation in which the source terminal aperiodically broadcasts the source reference signal may be used. For example, in the foregoing home scenario, super-market scenario, or field positioning (including field rescue) scenario, the source terminal does not need to broadcast the source reference signal when receiving no user instruction, so that electric energy of the terminal can be effectively reduced.

It should be noted that, in step 601, the source terminal broadcasts the cooperative positioning request, and in step 602, the source terminal broadcasts the source reference signal. A plurality of terminals in the cooperative terminal group may receive the cooperative positioning request and the source reference signal, and each terminal determines whether relative location information between the terminal and the source terminal needs to be determined.

By using any one of the terminals as an example, the terminal may determine whether there is a line of sight path between the terminal and the source terminal, to obtain line of sight path status information, and then send the line of sight path status information and terminal capability information of the terminal to the source terminal. If the source terminal determines that a relative positioning condition is met between the source terminal and the terminal, the terminal is indicated to measure a positioning measurement reference signal broadcast by the source terminal. In another implementation, the source terminal may also send terminal capability information of the source terminal to each terminal, and each terminal determines whether a relative positioning condition is met between the terminal and the source terminal, to independently determine whether to measure the positioning measurement reference signal. After the reference signal measurement is completed, the relative location information between the terminal and the source terminal is obtained, and the terminal may be used as a cooperative terminal.

This manner is not only used by the source terminal and the cooperative terminal to determine whether the relative positioning condition is met, but also used by a plurality of cooperative terminals to determine whether the relative positioning condition is met.

For example, in FIG. 5, a cooperative positioning request broadcast by the terminal 1 may be received by the terminal 2 and the terminal 3. A relative positioning condition is met between the terminal 2 and the terminal 1. The terminal 2 measures a reference signal of the terminal 1, and calculates and determines relative location information between the terminal 2 and the terminal 1. A relative positioning condition is not met between the terminal 3 and the terminal 1.

The description is also applicable to the following implementation 2. In the following implementation 2, a terminal that measures the reference signal of the source terminal may be referred to as a first cooperative terminal.

Based on the foregoing description, there may be one or more cooperative terminals. The following step 603 to step 608 may be described by using one of the cooperative terminals as an example.

Step 603: The cooperative terminal receives the cooperative positioning request from the source terminal, and in response to the cooperative positioning request, measures the source reference signal broadcast by the source terminal, to determine first relative location information.

The cooperative terminal parses the cooperative positioning request, determines that the cooperative positioning request includes the source terminal identifier and the target terminal identifier, and determines to assist the source terminal in determining the target relative location information between the source terminal and the target terminal. Further, in response to the cooperative positioning request, the cooperative terminal determines the time-frequency resource of the source reference signal, then measures the source reference signal on the time-frequency resource to obtain a measurement result, and determines the first relative location information between the cooperative terminal and the source terminal based on the measurement result.

In an optional implementation, the cooperative terminal receives the preset configuration information from the network device, determines, from the preset configuration information based on the identifier of the source terminal in the cooperative positioning request, the resource indication information corresponding to the source terminal, determines, based on the resource indication information corresponding to the source terminal, the time-frequency resource used by the source terminal to broadcast the source reference signal, and measures the source reference signal on the time-frequency resource.

Still with reference to FIG. 1 and FIG. 5, for example, the cooperative terminal is the terminal 2. The terminal 2 receives the preset configuration information from the network device, determines, from the preset configuration information, the resource indication information 1 corresponding to the terminal 1, determines the time-frequency resource 1 based on the resource indication information 1, and then measures, on the time-frequency resource 1, a source reference signal broadcast by the terminal 1.

In another optional implementation, the cooperative terminal obtains, from the cooperative positioning request, the resource indication information corresponding to the source terminal, and receives, on a corresponding time-frequency resource based on the resource indication information corresponding to the source terminal, the source reference signal broadcast by the source terminal. The resource indication information corresponding to the source terminal may be included in the cooperative positioning request, or may be sent by the source terminal to the cooperative terminal as an independent message.

When the cooperative positioning request includes the resource indication information corresponding to the source terminal, for a schematic diagram of a format of the cooperative positioning request, refer to (b) in FIG. 7. The cooperative positioning request includes the source terminal identifier, the target terminal identifier, the preset time information, and the resource indication information corresponding to the source terminal. For description of each field, refer to the foregoing embodiment. Details are not described again.

In a specific implementation, the source terminal selects, from the resource pool, a time-frequency resource used to broadcast the source reference signal, and uses resource indication information of the time-frequency resource as the resource indication information corresponding to the source terminal and includes the resource indication information in the cooperative positioning request. The cooperative terminal determines, based on the resource indication information in the cooperative positioning request, the time-frequency resource used by the source terminal to broadcast the source reference signal, and measures the source reference signal on the time-frequency resource.

Still with reference to FIG. 1 and FIG. 5, for example, the terminal 1 selects the time-frequency resource 1 from the resource pool, uses the resource indication information 1 of the time-frequency resource 1 as the resource indication information corresponding to the source terminal, and includes the resource indication information in the cooperative positioning request. The cooperative terminal is the terminal 2. The terminal 2 obtains the resource indication information 1 from the cooperative positioning request, determines the time-frequency resource 1 based on the resource indication information 1, and measures, on the time-frequency resource 1, the source reference signal broadcast by the terminal 1.

In addition, the cooperative positioning request may further include a trigger indication. The trigger indication is used to indicate a terminal that receives the cooperative positioning request to measure the source reference signal on the corresponding time-frequency resource based on the resource indication information in the cooperative positioning request, and simultaneously send the cooperative reference signal.

Step 604: The cooperative terminal broadcasts the positioning information.

The positioning information may also be referred to as cooperative positioning information (cooperative positioning information).

The positioning information includes the source terminal identifier, the target terminal identifier, a cooperative terminal identifier, and the first relative location information. The cooperative terminal identifier is a terminal identifier of the cooperative terminal. Further, the first relative location information includes the source terminal identifier and a relative location (which may be referred to as a first relative location) between the source terminal and the cooperative terminal.

In an example, the first relative location information may further include a first timestamp. The first timestamp is used to indicate a time at which the cooperative terminal determines the first relative location information.

Figure 8A:
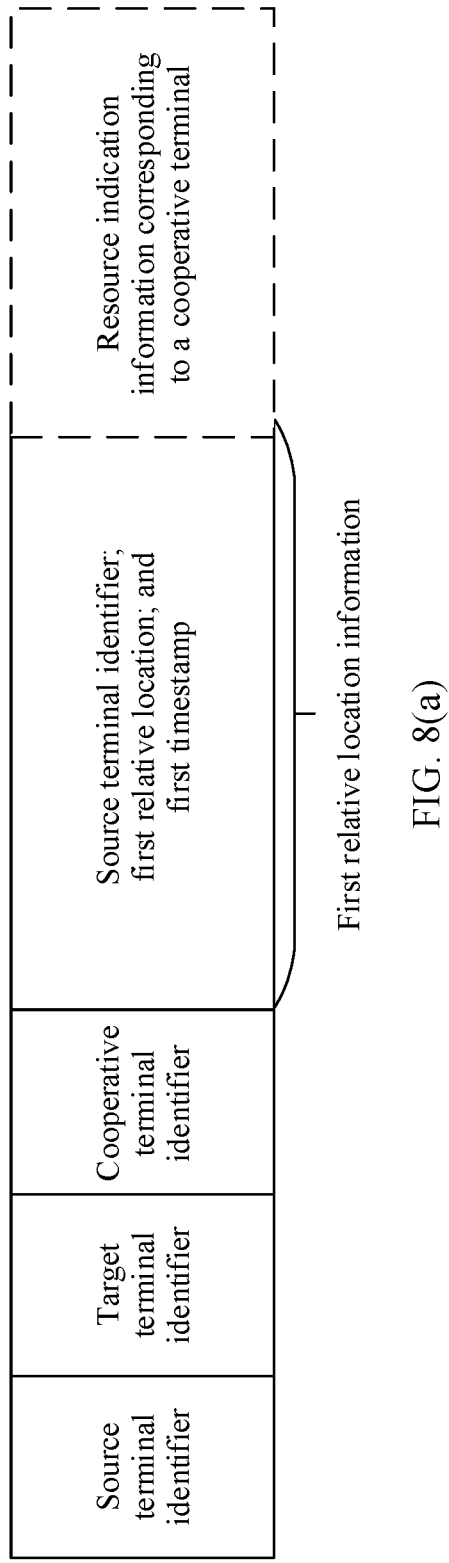
FIG. 8($a$) to FIG. 8($c$) are a schematic diagram of a format of a group of positioning information according to this application.

FIG. 8(*a*) is a schematic diagram of a format of a first type of positioning information according to an example of this application, including the source terminal identifier, the target terminal identifier, the cooperative terminal identifier, and the first relative location information. The first relative location information includes the source terminal identifier, the first relative location, and the first timestamp.

Step 605: The cooperative terminal broadcasts the cooperative reference signal.

In this application, a reference signal broadcast by the cooperative terminal may be referred to as the cooperative reference signal for short.

The cooperative terminal may periodically or aperiodically broadcast the cooperative reference signal. For details, refer to a specific implementation in which the source terminal periodically or aperiodically broadcasts the source reference signal in step 602.

If the cooperative terminal aperiodically broadcasts the cooperative reference signal, refer to FIG. 8(*a*). The positioning information may further include resource indication information corresponding to the cooperative terminal, and the resource indication information corresponding to the cooperative terminal is used to indicate a time-frequency resource used by the cooperative terminal to broadcast the cooperative reference signal.

In addition, the positioning information may further include a trigger indication. The trigger indication is used to indicate a terminal that receives the positioning information to measure the cooperative reference signal on the corresponding resource based on the resource indication information in the positioning information.

In this application, each terminal in the cooperative terminal group may broadcast a reference signal of each terminal in a same manner. For example, the source terminal periodically broadcasts a source reference signal, and the cooperative terminal also periodically broadcasts a cooperative reference signal; or the source terminal aperiodically broadcasts a source reference signal, and the cooperative terminal also aperiodically broadcasts a cooperative reference signal. Certainly, a technical solution in which each terminal broadcasts the reference signal of the terminal in different manners is not excluded. For example, the source terminal periodically broadcasts a source reference signal, and the cooperative terminal aperiodically broadcasts a cooperative reference signal. The description is also applicable to the implementation 2.

It should be noted that, in step 604, the cooperative terminal broadcasts the positioning information, and in step 605, the cooperative terminal broadcasts the cooperative reference signal. A plurality of terminals in the cooperative terminal group may receive the positioning information and the cooperative reference signal, and each terminal determines whether relative location information between the terminal and the cooperative terminal needs to be determined. For details, refer to the description before step 603.

Further, the positioning information and the cooperative reference signal may be received by the target terminal and/or the source terminal. The target terminal may measure the cooperative reference signal based on the positioning information, determine relative location information between the target terminal and the cooperative terminal, and obtain the first relative location information from the positioning information.

Because the positioning information already includes the relative location information between the source terminal and the cooperative terminal, the source terminal does not need to measure the reference signal of the cooperative terminal again, and the source terminal may directly obtain the first relative location information from the positioning information. In another embodiment, the source terminal may alternatively directly discard the received positioning information. For details, refer to description in the following embodiment.

Still with reference to FIG. 1 and FIG. 5, for example, the terminal 2 is the cooperative terminal, and the terminal 2 broadcasts positioning information including the relative location information between the terminal 2 and the terminal 1. The positioning information may be received by the terminal 3, the terminal 4, and the terminal 1. A relative positioning condition is met between the terminal 3 and the terminal 2, and the terminal 3 measures s a reference signal of the terminal 2, to determine relative location information between the terminal 3 and the terminal 2. A relative positioning condition is not met between the terminal 4 and the terminal 2. The terminal 1 does not need to measure the reference signal of the terminal 2 again, and may directly obtain the relative location information between the terminal 2 and the terminal 1 from the positioning information, or directly discard the positioning information of the terminal 2.

The description is also applicable to the following implementation 2.

Step 606: The target terminal receives positioning information from the cooperative terminal, and in response to the positioning information, measures the cooperative reference signal broadcast by the cooperative terminal, to determine second relative location information.

The target terminal parses the positioning information, and determines that the positioning information includes the source terminal identifier, the target terminal identifier, the cooperative terminal identifier, and the first relative location information. The target terminal determines the time-frequency resource of the cooperative reference signal in response to the positioning information, then measures the cooperative reference signal on the time-frequency resource to obtain a measurement result, and determines relative location information (that is, the second relative location information) between the cooperative terminal and the target terminal based on the measurement result.

For a specific manner in which the cooperative terminal determines the time-frequency resource of the cooperative reference signal, refer to the description in step 603. Details are not described again.

For example, the second relative location information includes the target terminal identifier and a relative location (which may be referred to as a second relative location) between the target terminal and the cooperative terminal. The second relative location information may further include a second timestamp. The second timestamp is a time at which the target terminal determines the second relative location information.

After step 606, the target terminal or the source terminal may determine the target relative location information.

For that the target terminal determines the target relative location information, refer to an example a, including the following step 607*a* and step 608*a*.

Step 607*a*: The target terminal determines the target relative location information based on the first relative location information and the second relative location information that are obtained from the positioning information.

The first relative location information includes a relative distance and a relative angle between the cooperative terminal and the source terminal, and the second relative location information includes a relative distance and a relative angle between the cooperative terminal and the target terminal. The target terminal determines the relative distance and the relative angle between the cooperative terminal and the source terminal based on the relative distance and the relative angle between the cooperative terminal and the target terminal, that is, determines the target relative location information.

Step 608*a*: The target terminal sends a positioning response to the source terminal, where the positioning response includes the target relative position information.

The target terminal may send the positioning response to the source terminal in a broadcast manner or a unicast manner.

In this embodiment, the source terminal only needs to receive the positioning response from the target terminal, and obtain the target relative position information from the positioning response. The source terminal may directly discard the positioning information from the cooperative terminal.

For that the source terminal determines the target relative location information, refer to an example b, including the following step 607b and step 608b.

Step 607b: The target terminal sends a positioning response to the source terminal, where the positioning response includes the second relative position information.

The target terminal may send the positioning response to the source terminal in a broadcast manner or a unicast manner. The source terminal receives the positioning response from the target terminal, and obtains the second relative location information from the positioning response.

Step 608b: The source terminal determines the target relative location information based on the first relative location information obtained from the positioning information and the second relative location information obtained from the positioning response.

For a specific determining manner, refer to the description in step 607a.

In another example in which the source terminal determines the target relative location information, the positioning response may further include the first relative location information. The source terminal obtains the first relative location information and the second relative location information from the positioning response, and determines the target relative location information based on the first relative location information and the second relative location information.

Optionally, the source terminal may further send the target relative location information to the target terminal.

After step 608a or step 608b, the source terminal or the target terminal may end the cooperative positioning process. In an optional manner, the source terminal or the target terminal broadcasts a cooperative positioning end message, and after any terminal in the cooperative terminal group receives the positioning end message, the cooperative positioning process ends.

In addition, if the source terminal or the target terminal fails to determine the target relative location information, the source terminal or the target terminal may broadcast the cooperative positioning end message, to indicate each terminal in the cooperative terminal group to stop the current cooperative positioning process.

Herein, each terminal in the cooperative terminal group may include any one or more of the cooperative terminal, the target terminal, and the source terminal.

In an optional manner, when determining that duration of the current cooperative positioning process exceeds the first preset duration, the source terminal broadcasts the cooperative positioning end message. After receiving the cooperative positioning end message, each terminal (including the cooperative terminal and the target terminal) in the cooperative terminal group ends the current cooperative positioning process.

Further, the source terminal may re-initiate a cooperative positioning process after waiting for second preset duration. In some embodiments, absolute positioning information of the source terminal and absolute positioning information of the target terminal may be further determined based on base station assistance or satellite assistance, and then the target relative location information is determined based on the absolute positioning information of the source terminal and the target terminal.

In addition, each terminal (which may include the cooperative terminal, the source terminal, and the target terminal) in the cooperative terminal group may also actively end the cooperative positioning process based on the timestamp in the cooperative positioning request and the first preset duration. For example, when determining that a current moment is the moment t0+T0, each terminal actively ends the foregoing cooperative positioning process.

Figure 9:
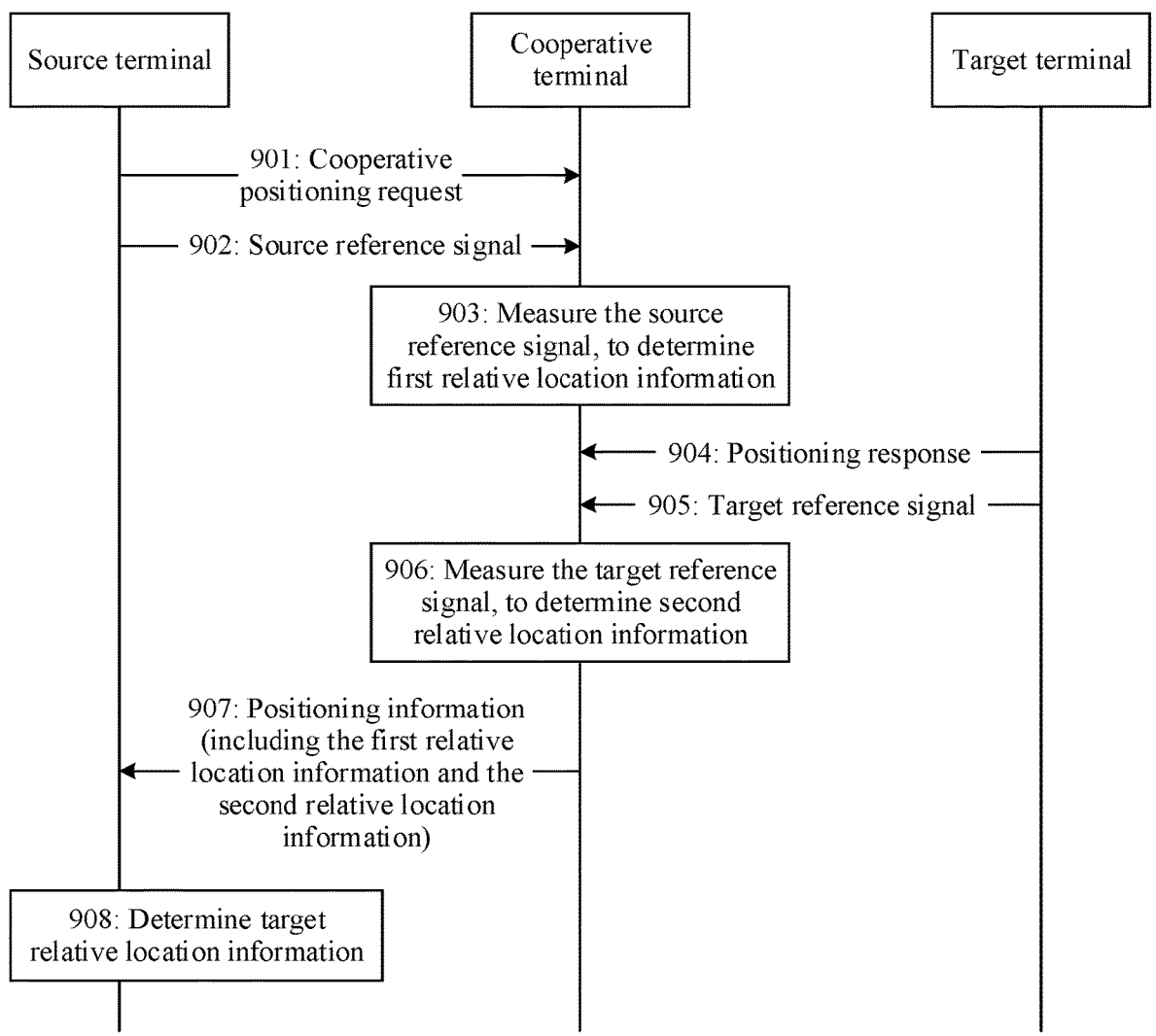
FIG. 9 is a schematic diagram of a second cooperative positioning process according to this application.

FIG. 9 is a schematic flowchart of a second cooperative positioning process according to an embodiment of this application. The process is as follows.

Step 901: A source terminal broadcasts a cooperative positioning request.

Step 902: The source terminal broadcasts a source reference signal.

Step 903: A cooperative terminal receives the cooperative positioning request from the source terminal, and in response to the cooperative positioning request, measures the source reference signal broadcast by the source terminal, to determine first relative location information.

For specific implementations of step 901 to step 903, refer to the specific implementations of step 601 to step 603. Details are not described again.

Step 904: A target terminal receives the cooperative positioning request from the source terminal, and broadcasts a positioning response of the target terminal in response to the cooperative positioning request.

In an optional manner, the target terminal determines that the cooperative positioning request includes a source terminal identifier and a target terminal identifier, and broadcasts the positioning response of the target terminal in response to the cooperative positioning request. The positioning response includes the source terminal identifier and the target terminal identifier. The positioning response herein is different from the positioning response in the related embodiment in FIG. 6. The positioning response herein is understood as a response of the target terminal to the cooperative positioning request of the source terminal, and the positioning response indicates the cooperative terminal to measure a positioning measurement reference signal broadcast by the target terminal.

Step 905: The target terminal broadcasts a target reference signal.

In this application, a reference signal broadcast by the target terminal may be referred to as the target reference signal for short.

The target terminal may periodically or aperiodically broadcast the target reference signal. For details, refer to a specific implementation in which the source terminal periodically or aperiodically broadcasts the source reference signal in step 602.

If the target terminal aperiodically broadcasts the reference signal, the positioning response may further include resource indication information corresponding to the target terminal, and the resource indication information corresponding to the target terminal is used to indicate a time-frequency resource used by the target terminal to broadcast the target reference signal.

Step 906: The cooperative terminal receives the positioning response from the target terminal, and in response to the positioning response, measures the target reference signal broadcast by the target terminal, to determine second relative location information.

For a specific implementation in which the cooperative terminal measures the target reference signal broadcast by the target terminal, and determines the second relative location information, refer to step 603. Details are not described again.

Step 907: The cooperative terminal broadcasts positioning information. The positioning information includes the first relative location information and the second relative location information.

Figure 8B:
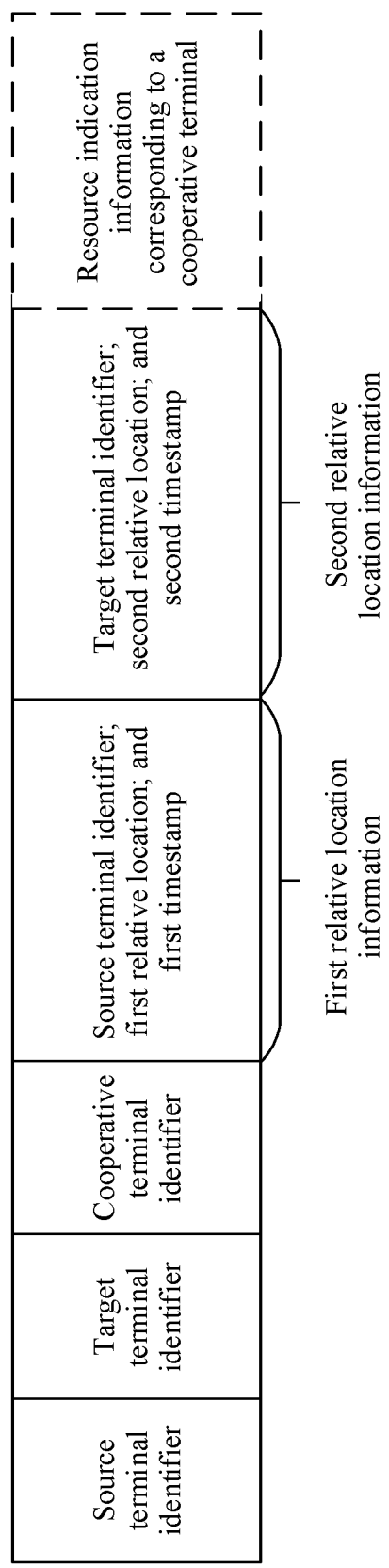

For example, FIG. 8(b) is a schematic diagram of a format of a second type of positioning information according to an example of this application, including the source terminal identifier, the target terminal identifier, the cooperative terminal identifier, the first relative location information, and the second relative location information. The first relative location information includes the source terminal identifier, a first relative location, and a first timestamp, and the second relative location information includes the target terminal identifier, a second relative location, and a second timestamp. Optionally, the positioning information further includes resource indication information corresponding to the cooperative terminal.

Step 908: The source terminal receives the positioning information from the cooperative terminal, and determines target relative location information based on the first relative location information and the second relative location information that are included in the positioning information.

Certainly, in this embodiment of this application, alternatively, the target terminal may receive the positioning information from the cooperative terminal, and determine the target relative location information based on the first relative location information and the second relative location information that are included in the positioning information.

In addition, the cooperative terminal may further first determine the target relative location information based on the first relative location information and the second relative location information, and then broadcast the positioning information including the target relative location information. The source terminal and/or the target terminal receive/receives the positioning information, and obtain/obtains the target relative location information from the positioning information.

For all implementations that are not described in detail in this embodiment of this application, refer to description in the related embodiment in FIG. 6.

In addition, because each terminal may broadcast a reference signal, and another terminal may also measure the reference signal to obtain relative location information with the terminal. However, in an actual scenario, the cooperative terminal may not only obtain relative location information of the source terminal and/or the target terminal, but also obtain relative location information of the another terminal.

In an implementation, the positioning information broadcast by the cooperative terminal includes a plurality of pieces of relative location information associated with the cooperative terminal, for example, relative location information between the cooperative terminal and the source terminal, relative location information between the cooperative terminal and the target terminal, and relative location information between the cooperative terminal and another terminal (a terminal other than the source terminal and the target terminal in the cooperative terminal group).

The terminal 2 in FIG. 5 is used as an example. The terminal 2 may not only determine the relative location information between the terminal 2 and the terminal 1, but also measure a reference signal from another terminal (for example, the terminal 3 or the terminal 4) when there is a line of sight path, to determine relative location information between the terminal 2 and the another terminal. Alternatively, the terminal 2 may further receive relative location information (for example, relative location information that is broadcast by the terminal 3 and that is between the terminal 3 and the terminal 2, relative location information that is broadcast by the terminal 4 and that is between the terminal 4 and the terminal 1, relative location information that is broadcast by the terminal 4 and that is between the terminal 4 and the terminal 2, and relative location information that is broadcast by the terminal 4 and that is between the terminal 4 and the terminal 3) from another terminal, and the terminal 2 may add relative location information associated with the terminal to the positioning information for broadcasting. For example, the positioning information broadcast by the terminal 2 includes the relative location information between the terminal 2 and the terminal 1, the relative location information between the terminal 2 and the terminal 3, the relative location information between the terminal 2 and the terminal 4, and the like.

Figure 8C:
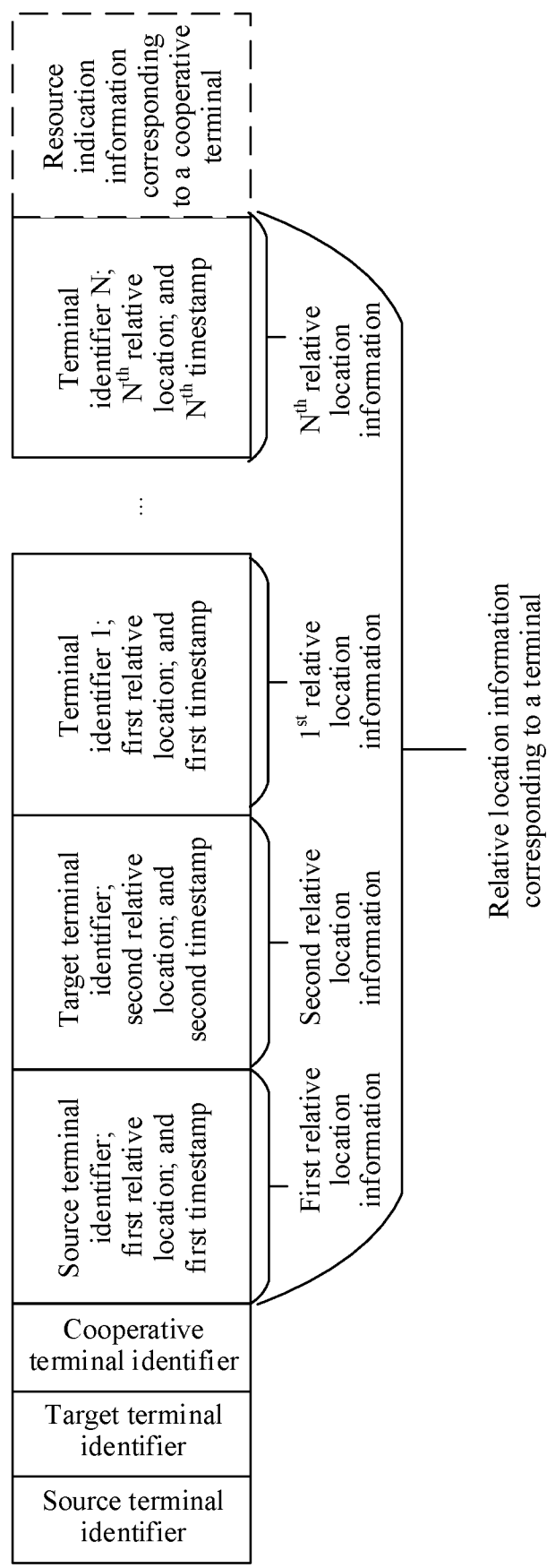

For example, FIG. 8(c) shows a third type of positioning information according to an example in this application. The positioning information includes the source terminal identifier, the target terminal identifier, the cooperative terminal identifier, and the relative location information associated with the cooperative terminal. The relative location information associated with the cooperative terminal not only includes the first relative location information between the cooperative terminal and the source terminal and the second relative location information between the cooperative terminal and the target terminal, but also includes relative location information between the cooperative terminal and another terminal, for example, includes the $1^{st}$ relative location information. The $1^{st}$ relative location information is relative location information between the cooperative terminal and a terminal corresponding to a terminal identifier 1. Optionally, the resource indication information corresponding to the cooperative terminal is further included.

In this embodiment, each piece of relative location information is associated with the terminal (a same terminal), and the positioning information already includes the cooperative terminal identifier. Therefore, each piece of relative location information needs to include only a terminal identifier of a terminal that has relative location information with the terminal. This helps reduce signaling load in the entire cooperative positioning process.

In addition, in this embodiment of this application, a plurality of cooperative positioning paths may be included. For details, refer to description in FIG. 5. The final target relative location information may be determined based on relative location information respectively corresponding to the plurality of cooperative positioning paths. With reference to two cooperative positioning paths in FIG. 5, step 607a is used as an example for description. The terminal 3 may obtain the relative location information between the terminal 2 and the terminal 1 from the positioning information of the terminal 2, and measure a reference signal of the terminal 2 to obtain the relative location information between the terminal 3 and the terminal 2. Likewise, the terminal 3 may obtain the relative location information between the terminal 4 and the terminal 1 from positioning information of the terminal 4, and measure the reference signal of the terminal 4 to obtain the relative location information between the terminal 3 and the terminal 4. Then, the terminal 3 determines target relative location information between the terminal 3 and the terminal 1 based on the relative location information corresponding to the two cooperative positioning paths. Specifically, the terminal 3 may determine, based on a positioning error corresponding to each cooperative positioning path, relative location information corresponding to a specific positioning path to be used for determining, or determine based on the relative location information corresponding to the two cooperative positioning paths. The description is also applicable to the implementation 2.

To better explain this embodiment of this application, the following uses an example with reference to the V2X scenario in FIG. 3 for description. The source terminal and the target terminal are respectively the vehicle A and the roadside infrastructure. In the V2X scenario, each terminal sends a periodic reference signal.

Specifically, the vehicle A broadcasts a cooperative positioning request and a reference signal of the vehicle A. The cooperative positioning request includes an identifier of the vehicle A and a roadside infrastructure identifier.

In response to the cooperative positioning request of the vehicle A, the vehicle B measures the reference signal broadcast by the vehicle A, to determine relative location information between the vehicle B and the vehicle A. The vehicle B broadcasts positioning information and a cooperative reference signal of the vehicle B. The positioning information of the vehicle B includes an identifier of the vehicle A, the roadside infrastructure identifier, and the relative location information between the vehicle B and the vehicle A.

In response to the positioning information of the vehicle B, the roadside infrastructure measures a reference signal broadcast by the vehicle B, and determines relative location information between the roadside infrastructure and the vehicle B.

The roadside infrastructure determines relative location information between the roadside infrastructure and the vehicle A based on the relative location information between the vehicle B and the vehicle A that is included in the positioning information of the vehicle B and the determined relative location information between the roadside infrastructure and the vehicle B. The roadside infrastructure sends a positioning response to the vehicle A. The positioning response includes the relative location information between the roadside infrastructure and the vehicle A.

Implementation 2

For example, with reference to FIG. 1, it is assumed that there is no line of sight path between the terminal 1 and the terminal 3, and there is a line of sight path between the terminal 1 and the terminal 2, between the terminal 2 and the terminal 4, and between the terminal 4 and the terminal 3. The terminal 2 and the terminal 4 may be used as cooperative terminals, and are configured to assist the terminal 1 and the terminal 3 in determining target relative position information. It should be understood that a cooperative positioning path is the terminal 1→the terminal 2→the terminal 4→the terminal 3. In addition, there may be one or more cooperative positioning paths between the terminal 1 and the terminal 3. For example, the terminal 2, the terminal 4, and the terminal 5 may also be used as cooperative terminals, and another cooperative positioning path is the terminal 1→the terminal 2→the terminal 4→the terminal 5→the terminal 3. For the one or more cooperative positioning paths between the terminal 1 and the terminal 3, refer to a topology relationship diagram of a terminal in a second cooperative positioning process shown in FIG. 10 as an example.

Figure 10:
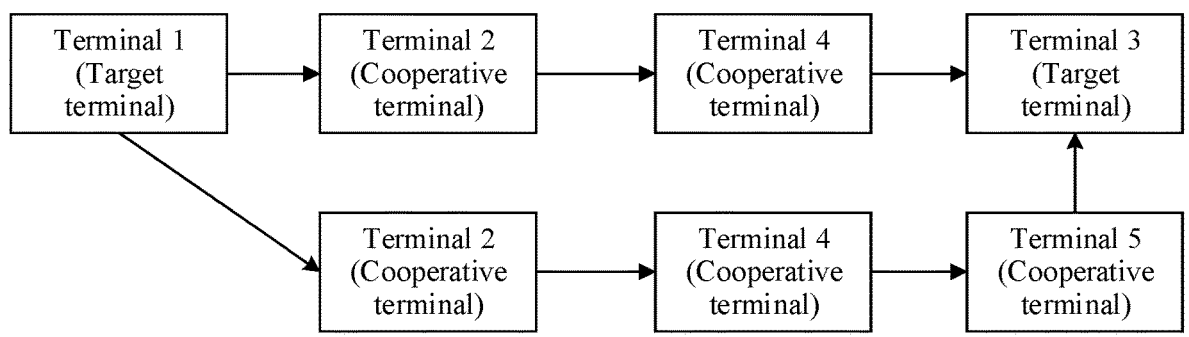
FIG. 10 is a topology relationship diagram of terminals in a second cooperative positioning process according to this application.
Figure 11A:
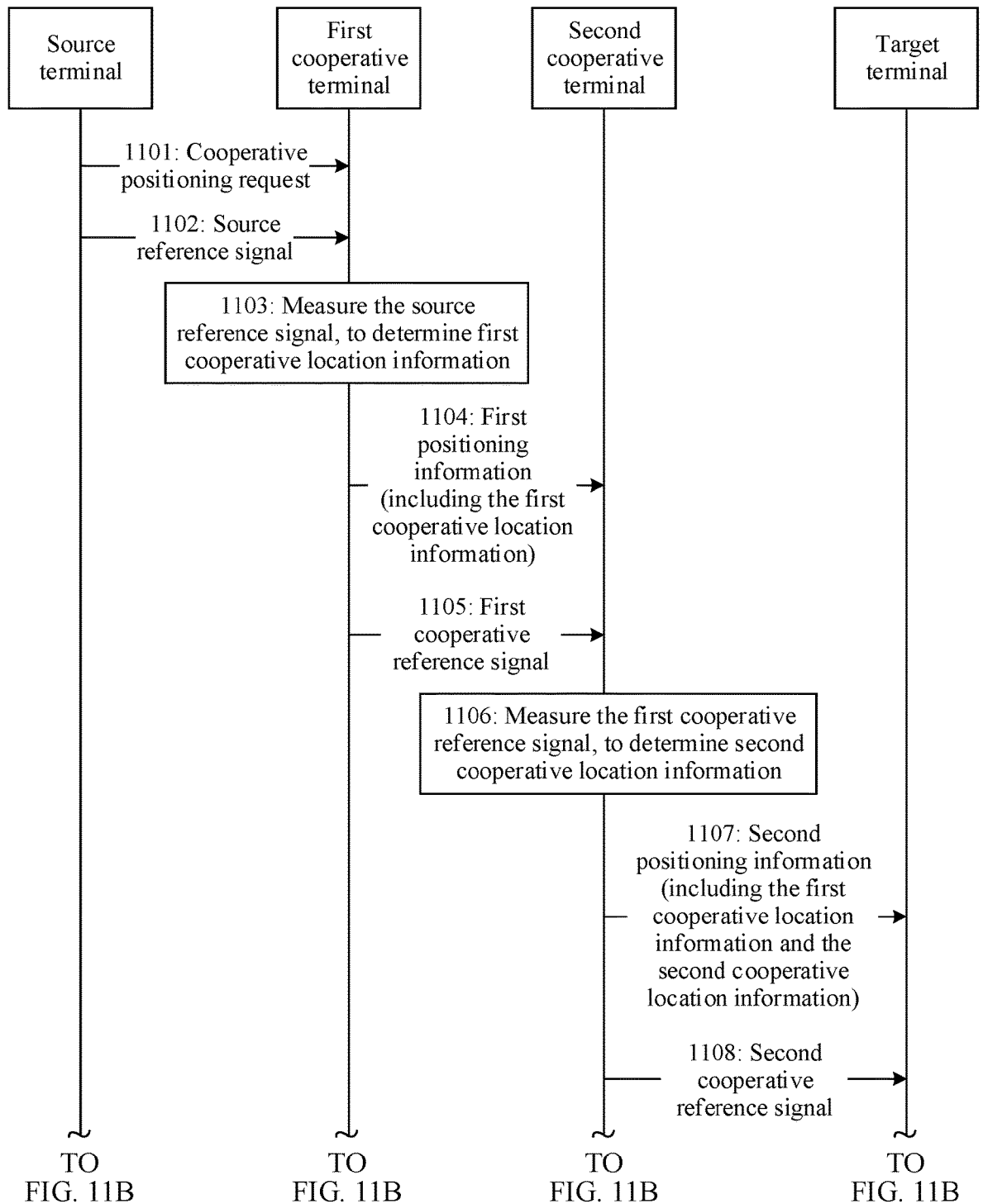
FIG. 11A and FIG. 11B are a schematic flowchart of a third cooperative positioning method according to this application.
Figure 11B:
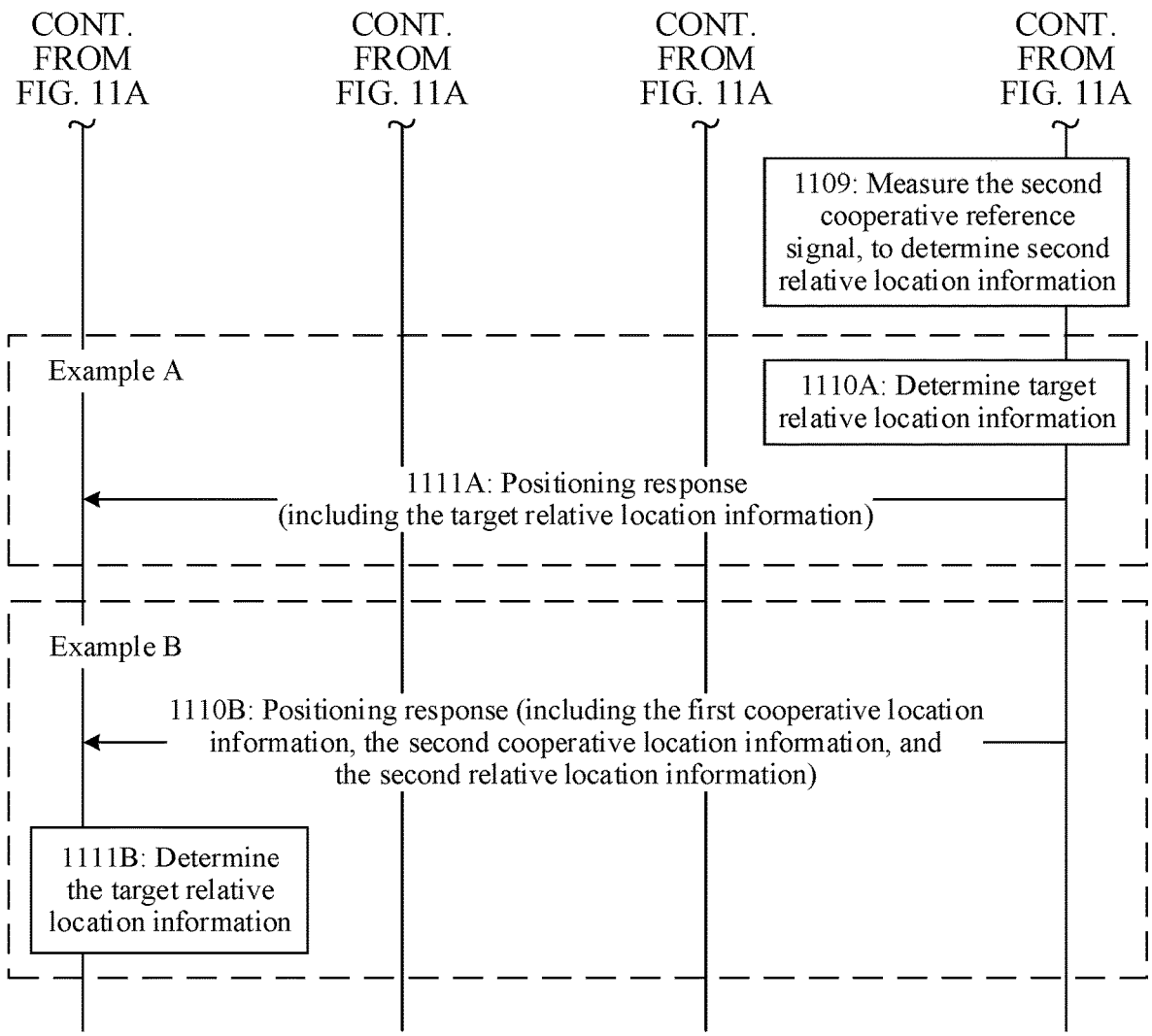

FIG. 11A and FIG. 11B are a schematic diagram of an example of a third cooperative positioning procedure according to this application. An example in which there are two cooperative terminals is used for description in this process. The two cooperative terminals are respectively a first cooperative terminal and a second cooperative terminal. There is a line of sight path between the first cooperative terminal and a source terminal, between the first cooperative terminal and the second cooperative terminal, and between the second cooperative terminal and a target terminal. A cooperative positioning path is the source terminal→the first cooperative terminal→the second cooperative terminal→the target terminal. For example, the first cooperative terminal may be the terminal 2 in FIG. 10, and the second cooperative terminal may be the terminal 4 in FIG. 10.

In this application, relative location information between the source terminal and the first cooperative terminal may be referred to as first cooperative location information (which may also be referred to as the first relative location information in the foregoing implementation 1), relative location information between the first cooperative terminal and the second cooperative terminal may be referred to as second cooperative location information, and relative location information between the second cooperative terminal and the target terminal is referred to as second relative location information.

The process is as follows.

Step 1101: The source terminal broadcasts a cooperative positioning request.

Step 1102: The source terminal broadcasts a source reference signal.

For specific implementations of step 1101 and step 1102, refer to the specific implementations of step 601 and step 602. Details are not described again. In addition, there may be one or more first cooperative terminals. The following step 1103 to step 1105 may be described by using one of the first cooperative terminals as an example.

Step 1103: The first cooperative terminal receives the cooperative positioning request from the source terminal, and in response to the cooperative positioning request, measures the source reference signal broadcast by the source terminal, to determine the first cooperative location information.

Step 1104: The first cooperative terminal broadcasts first positioning information.

The first positioning information is positioning information obtained by the first cooperative terminal in response to the cooperative positioning request.

Figure 12A:
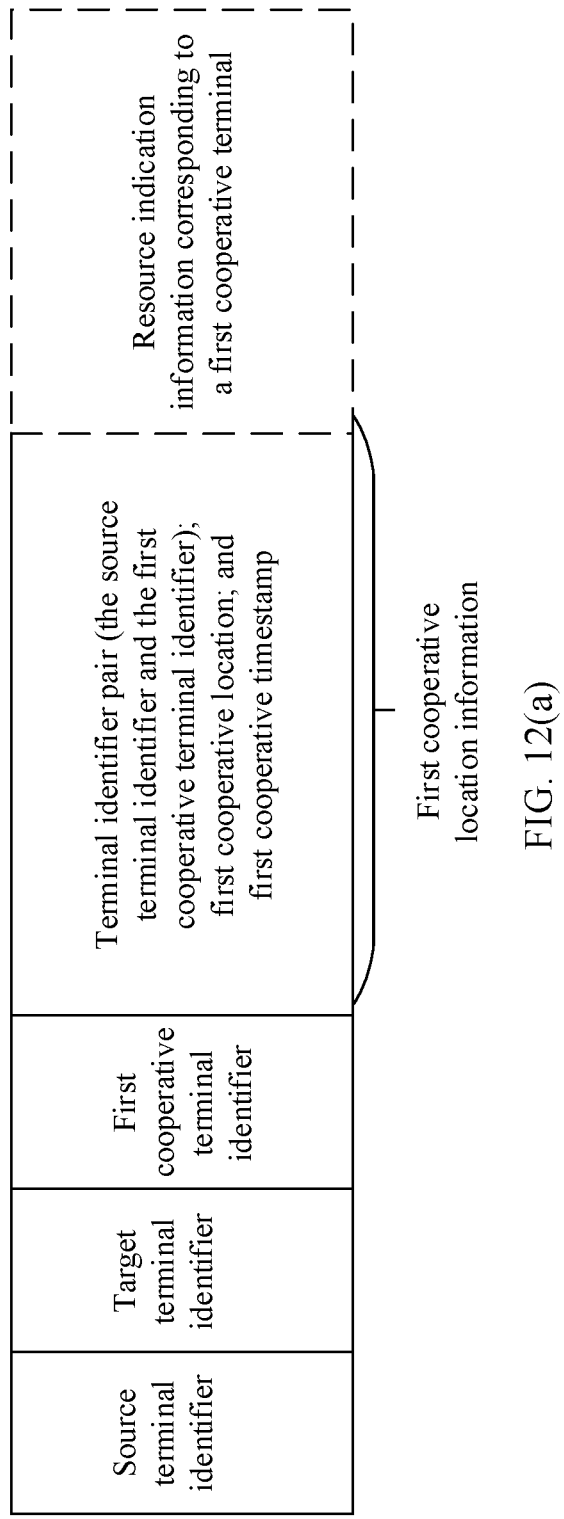
FIG. 12($a$) to FIG. 12($c$) are a schematic diagram of a format of another group of positioning information according to this application.
Figure 12C:
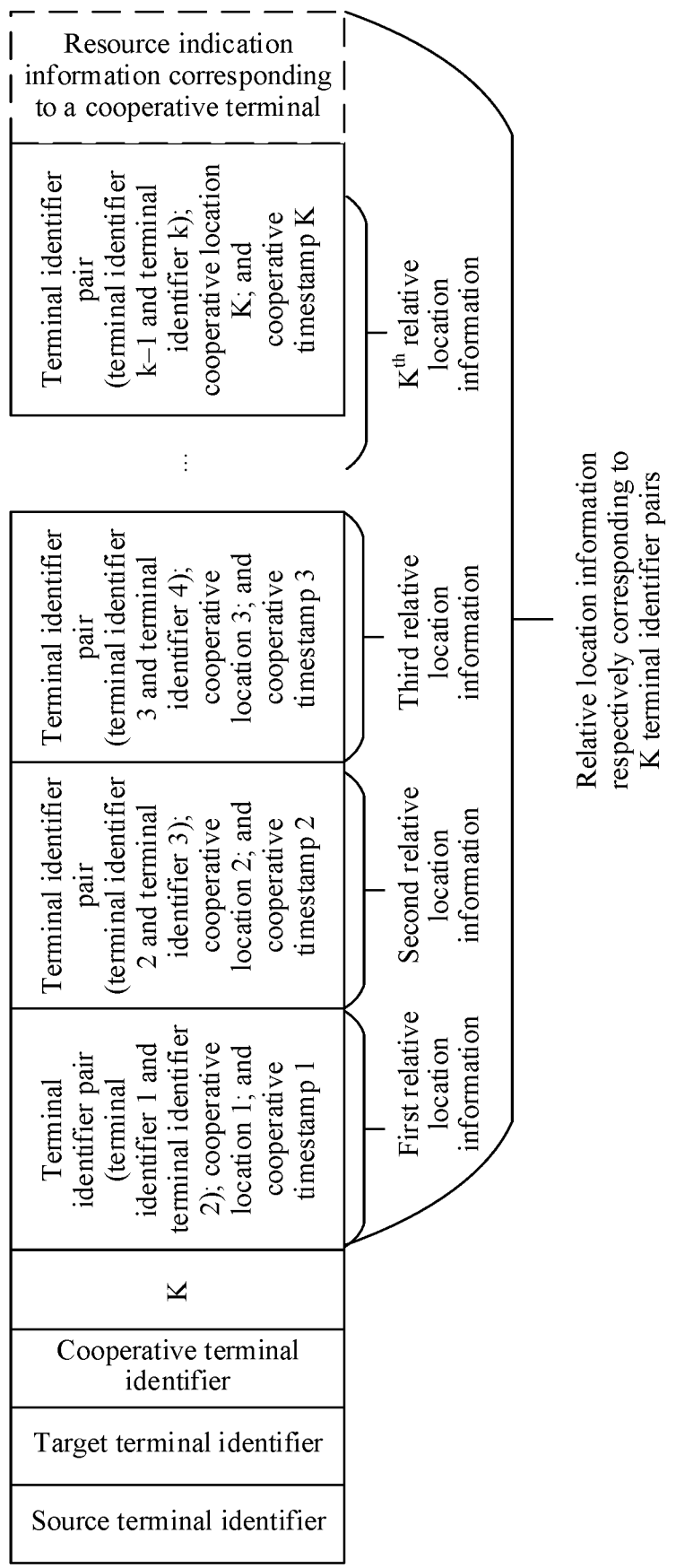

FIG. 12(*a*) is an example schematic diagram of a format of first positioning information according to this application. The first positioning information includes a source terminal identifier, a target terminal identifier, a cooperative terminal identifier (that is, a first cooperative terminal identifier), and the first cooperative location information.

Further, the first cooperative location information includes a terminal identifier pair (pair) and a relative location corresponding to the terminal identifier pair. Specifically, the terminal identifier pair includes the source terminal identifier and the first cooperative terminal identifier, and the relative location corresponding to the terminal identifier pair is a relative location (which may be referred to as a first cooperative location) between the source terminal and the first cooperative terminal.

In addition, the first cooperative location information may further include a first cooperative timestamp. The first cooperative timestamp is used to indicate a time at which the first cooperative terminal determines the first cooperative location information.

The first positioning information may further include resource indication information corresponding to the first cooperative terminal. The resource indication information corresponding to the first cooperative terminal is used to indicate a time-frequency resource used by the first cooperative terminal to broadcast a first cooperative reference signal.

Step 1105: The first cooperative terminal broadcasts the cooperative reference signal.

In this application, a reference signal broadcast by the first cooperative terminal may be referred to as the first cooperative reference signal for short. The first cooperative terminal may periodically or aperiodically broadcast the first cooperative reference signal. For details, refer to a specific implementation in which the source terminal periodically or aperiodically broadcasts the source reference signal in step 602.

It should be noted that, in step 1104, the first cooperative terminal broadcasts the first positioning information, and in step 1105, the first cooperative terminal broadcasts the first cooperative reference signal. A plurality of terminals in a cooperative terminal group may receive the first positioning information and the first cooperative reference signal. For details about that each terminal determines whether relative location information between the terminal and the first cooperative terminal needs to be determined, refer to the description before step 603. For example, if a specific terminal needs to determine relative location information between the terminal and the first cooperative terminal, the terminal may be referred to as a second cooperative terminal.

For example, in FIG. 10, the terminal 2 is the first cooperative terminal, and the first positioning information and the first cooperative reference signal sent by the terminal 2 may be received by the terminal 4 and the terminal 3. A relative positioning condition is met between the terminal 4 and the terminal 2. The terminal 4 measures a reference signal of the terminal 2, and calculates and determines relative location information between the terminal 4 and the terminal 2. The terminal 4 is the second cooperative terminal. A relative positioning condition is not met between the terminal 3 and the terminal 2.

Further, the first positioning information and the first cooperative reference signal may be received by the source terminal. Because the first positioning information already includes the relative location information between the source terminal and the first cooperative terminal, the source terminal does not need to measure the first cooperative reference signal again, and the source terminal may directly obtain the first cooperative location information from the first positioning information. In another embodiment, the source terminal may alternatively directly discard the received first positioning information. For details, refer to description in the following embodiment.

Based on the foregoing description, there may be one or more second cooperative terminals. The following step 1106 and step 1107 may be described by using one of the cooperative terminals as an example.

Step 1106: The second cooperative terminal receives the first positioning information from the first cooperative terminal, and measures, in response to the first positioning information, the first cooperative reference signal broadcast by the first cooperative terminal, to determine the second cooperative location information.

Step 1107: The second cooperative terminal broadcasts second positioning information.

The second positioning information is positioning information obtained by the second cooperative terminal in response to the first positioning information.

The second cooperative terminal may obtain the first cooperative location information from the first positioning information, and add the first cooperative location information and the second cooperative location information to the second positioning information.

FIG. 12(*b*) is an example schematic diagram of a format of the second positioning information according to this application. The second positioning information includes the source terminal identifier, the target terminal identifier, a cooperative terminal identifier (that is, a second cooperative terminal identifier), the first cooperative location information, and the second cooperative location information.

Further, the second cooperative location information includes the terminal identifier pair and the relative location information corresponding to the terminal identifier pair. Specifically, the terminal identifier pair includes the first cooperative terminal identifier and the second cooperative terminal identifier, and a relative location corresponding to the terminal identifier pair is a relative location (which may be referred to as a second cooperative location) between the first cooperative terminal and the second cooperative terminal.

In addition, the second cooperative location information may further include a second cooperative timestamp. The second cooperative timestamp is a time at which the second cooperative terminal determines the second cooperative location information.

The second positioning information may further include resource indication information corresponding to the second cooperative terminal. The resource indication information corresponding to the second cooperative terminal is used to indicate a time-frequency resource used by the second cooperative terminal to broadcast a second cooperative reference signal.

Step 1108: The second cooperative terminal broadcasts the second cooperative reference signal.

In this application, a reference signal broadcast by the second cooperative terminal may be referred to as the second cooperative reference signal for short. The second cooperative terminal may periodically or aperiodically broadcast the second cooperative reference signal. For details, refer to a specific implementation in which the source terminal periodically or aperiodically broadcasts the source reference signal in step 602.

It should be noted that, in step 1107, the second cooperative terminal broadcasts the second positioning information, and in step 1108, the second cooperative terminal broadcasts the second cooperative reference signal. The plurality of terminals in the cooperative terminal group may receive the second positioning information and the second cooperative reference signal. For details about that each terminal determines whether relative location information between the terminal and the second cooperative terminal needs to be determined, refer to the description before step 603.

Further, the second positioning information and the second cooperative reference signal may be received by the target terminal and/or the first cooperative terminal. The target terminal may measure the second cooperative reference signal based on the second positioning information, to determine relative location information between the target terminal and the second cooperative terminal, and obtain the first cooperative location information and the second cooperative location information from the second positioning information.

Because the second positioning information already includes the relative location information between the first cooperative terminal and the second cooperative terminal, the first cooperative terminal does not need to measure the reference signal of the cooperative terminal again.

Step 1109: The target terminal receives the second positioning information from the second cooperative terminal, and in response to the second positioning information, measures the second cooperative reference signal broadcast by the second cooperative terminal, to determine the second relative location information.

After step 1109, the target terminal or the source terminal may determine the target relative location information.

For that the target terminal determines the target relative location information, refer to an example A, including the following step 1110A and step 1111A.

Step 1110A: The target terminal determines the target relative location information based on the second relative location information and the first cooperative location information and the second cooperative location information that are obtained from the second positioning information.

Step 1111A: The target terminal sends a positioning response to the source terminal, where the positioning response includes the target relative position information. The target terminal may send the positioning response to the source terminal in a broadcast manner or a unicast manner.

For that the source terminal determines the target relative location information, refer to an example B, including the following step 1110B and step 1111B.

Step 1110B: The target terminal sends a positioning response to the source terminal, where the positioning response includes the second relative location information and the first cooperative location information and the second cooperative location information that are obtained from the second positioning information.

The target terminal may send the positioning response to the source terminal in a broadcast manner or a unicast manner.

Step 1111B: The source terminal determines the target relative location information based on the first cooperative location information, the second relative location information, and the second cooperative location information that are included in the positioning response.

For implementations that are not described in detail in this embodiment of this application, refer to description in the related embodiments in FIG. 6 and FIG. 9.

In addition, this application does not exclude the following possibilities. The target terminal obtains the first cooperative location information from the first positioning information, the source terminal obtains the first cooperative location information from the first positioning information, the source terminal obtains the second cooperative location information from the second positioning information, and the like.

In an example, the target terminal obtains the first cooperative location information from the first positioning information, obtains the second cooperative location information from the second positioning information, measures the second cooperative reference signal of the second cooperative terminal to determine the second relative location information, and determines the target relative location information based on the first cooperative location information, the second cooperative location information, and the second relative location information.

Alternatively, in another example, the source terminal obtains the first cooperative location information from the first positioning information, obtains the second cooperative location information from the second positioning information, obtains the second relative location information from the positioning response of the target terminal, and determines the target relative location information based on the first cooperative location information, the second cooperative location information, and the second relative location information.

In this implementation, a plurality of pieces of relative location information included in the positioning information broadcast by the cooperative terminal may be obtained in two manners. One is that the cooperative terminal obtains the plurality of pieces of relative location information from positioning information of a previous cooperative terminal. For example, the cooperative terminal may obtain all or part of the relative location information in the positioning information of the previous cooperative terminal. The other is that the cooperative terminal obtains the plurality of pieces of relative location information by measuring a reference signal broadcast by one or more terminals. A plurality of pieces of relative location information included in positioning information broadcast by any cooperative terminal may be related to or not related to the current cooperative terminal.

The terminal 4 in FIG. 10 is used as an example. The terminal 4 may not only determine the relative location information between the terminal 4 and the terminal 2, but also measure a reference signal from another terminal (for example, the terminal 3 or the terminal 5) to determine relative location information between the terminal 4 and the another terminal. Alternatively, the terminal 4 may further receive relative location information from the another terminal (for example, relative location information that is broadcast by the terminal 2 and that is between the terminal 2 and the terminal 1, and relative location information that is broadcast by the terminal 3 and that is between the terminal 3 and the terminal 5). The terminal 4 may add the relative location information to the positioning information of the terminal 4 for broadcasting. For example, the positioning information broadcast by the terminal 4 includes the relative location information between the terminal 2 and the terminal 1, the relative location information between the terminal 2 and the terminal 4, relative location information between the terminal 3 and the terminal 4, relative location information between the terminal 4 and the terminal 5, and the like.

For example, FIG. 12(*c*) shows a third type of positioning information according to an example in this application. The positioning information may be determined by any cooperative terminal. The positioning information includes the source terminal identifier, the target terminal identifier, the cooperative terminal identifier, and K pieces of relative location information, where K is greater than or equal to 1.

Further, each of the K pieces of relative location information includes a terminal identifier pair and a relative location between two terminals in the terminal identifier pair, and optionally, further includes a timestamp for determining the relative location information.

Refer to FIG. 12(*c*). For example, the K pieces of relative location information are respectively the first piece of relative location information to the $K^{th}$ piece of relative location information. The first piece of relative location information includes a terminal identifier pair (a terminal identifier 1 and a terminal identifier 2), a cooperative location 1, and a cooperative timestamp 1, the second piece of relative location information includes a terminal identifier pair (the terminal identifier 2 and a terminal identifier 3), a cooperative location 2, and a cooperative timestamp 2, the third piece of relative location information includes a terminal identifier pair (the terminal identifier 3 and a terminal identifier 4), a cooperative location 3, and a cooperative timestamp 3, . . . , and the $K^{th}$ piece of relative location information includes a terminal identifier pair (a terminal identifier k−1 and a terminal identifier k), a cooperative location K, and a cooperative timestamp K, where k is greater than or equal to 1.

In addition, to ensure data integrity, when determining the positioning information, the cooperative terminal may determine a quantity of relative location information. As shown in the figure, the field "K" indicates that the positioning information includes the K pieces of relative location information. When a next terminal receives the positioning information, the next terminal may parse the positioning information to obtain the quantity of relative location information, to determine integrity of relative location information included in the received positioning information. Such a design is applicable to any multi-hop cooperative positioning scenario.

In addition, when determining the positioning information of the cooperative terminal, the cooperative terminal may include relative location information that meets a validity period condition in the positioning information. For example, the cooperative terminal stores m pieces of relative location information, and each piece of relative location information corresponds to a timestamp, and m is greater than or equal to 1. Refer to the example 3 in step 601. The cooperative terminal determines that the cooperative positioning request includes the time period T2. When the positioning information is generated at the moment t2, relative location information corresponding to a timestamp between the moment (t2−T2) and the moment t2 is determined from the m pieces of relative location information, and is included in the positioning information together with the currently determined cooperative location information.

In the foregoing cooperative positioning process, only relative location information in a range of the second moment before the current moment is valid, and earlier relative location information is inaccurate or even invalid due to movement of the terminal. In this manner, relative location information that is determined earlier may be filtered out, thereby helping reduce signaling load while reducing a delay.

To better explain this embodiment of this application, the following uses an example with reference to the home scenario in FIG. 4 for description. The source terminal and the target terminal are respectively the mobile phone and the band. In the home scenario, each terminal sends an aperiodic reference signal.

Specifically, a user searches for a band location by using the mobile phone. The mobile phone broadcasts a cooperative positioning request and a reference signal of the mobile phone in response to a user instruction. The cooperative positioning request includes a mobile phone identifier, a band identifier, and resource indication information corresponding to the mobile phone.

In response to the cooperative positioning request of the mobile phone, the tablet computer measures, based on the resource indication information corresponding to the mobile phone, a reference signal broadcast by the mobile phone, and determines relative location information between the tablet computer and the mobile phone. The tablet computer broadcasts positioning information and a cooperative reference signal. The positioning information broadcast by the tablet computer includes the mobile phone identifier, the band identifier, a tablet computer identifier, the relative location information between the tablet computer and the mobile phone, and resource indication information corresponding to the tablet computer.

In response to the positioning information of the tablet computer, the sound box measures a reference signal of the tablet computer based on the resource indication information corresponding to the tablet computer, and determines relative position information between the sound box and the tablet computer. The sound box broadcasts positioning information and a cooperative reference signal. The positioning information broadcast by the sound box includes the mobile phone identifier, the band identifier, a sound box identifier, the relative position information between the sound box and the tablet computer, the relative position information between the tablet computer and the mobile phone that is obtained by the sound box from the positioning information broadcast by the tablet computer, and resource indication information corresponding to the sound box.

In response to the positioning information of the sound box, the band measures a reference signal of the sound box based on the resource indication information corresponding to the sound box, and determines relative position information between the sound box and the band. The band sends a positioning response to the mobile phone. The positioning response includes the mobile phone identifier, the band identifier, the relative location information between the sound box and the band, the relative location information between the tablet computer and the mobile phone that is obtained by the band from the positioning information of the sound box, and the relative location information between the sound box and the tablet computer.

In response to the positioning response, the mobile phone determines relative location information between the mobile phone and the band based on the relative location information between the sound box and the band, the relative location information between the tablet computer and the mobile phone, and the relative location information between the sound box and the tablet computer in the positioning response, and displays the relative location information on a display interface.

Figure 13:
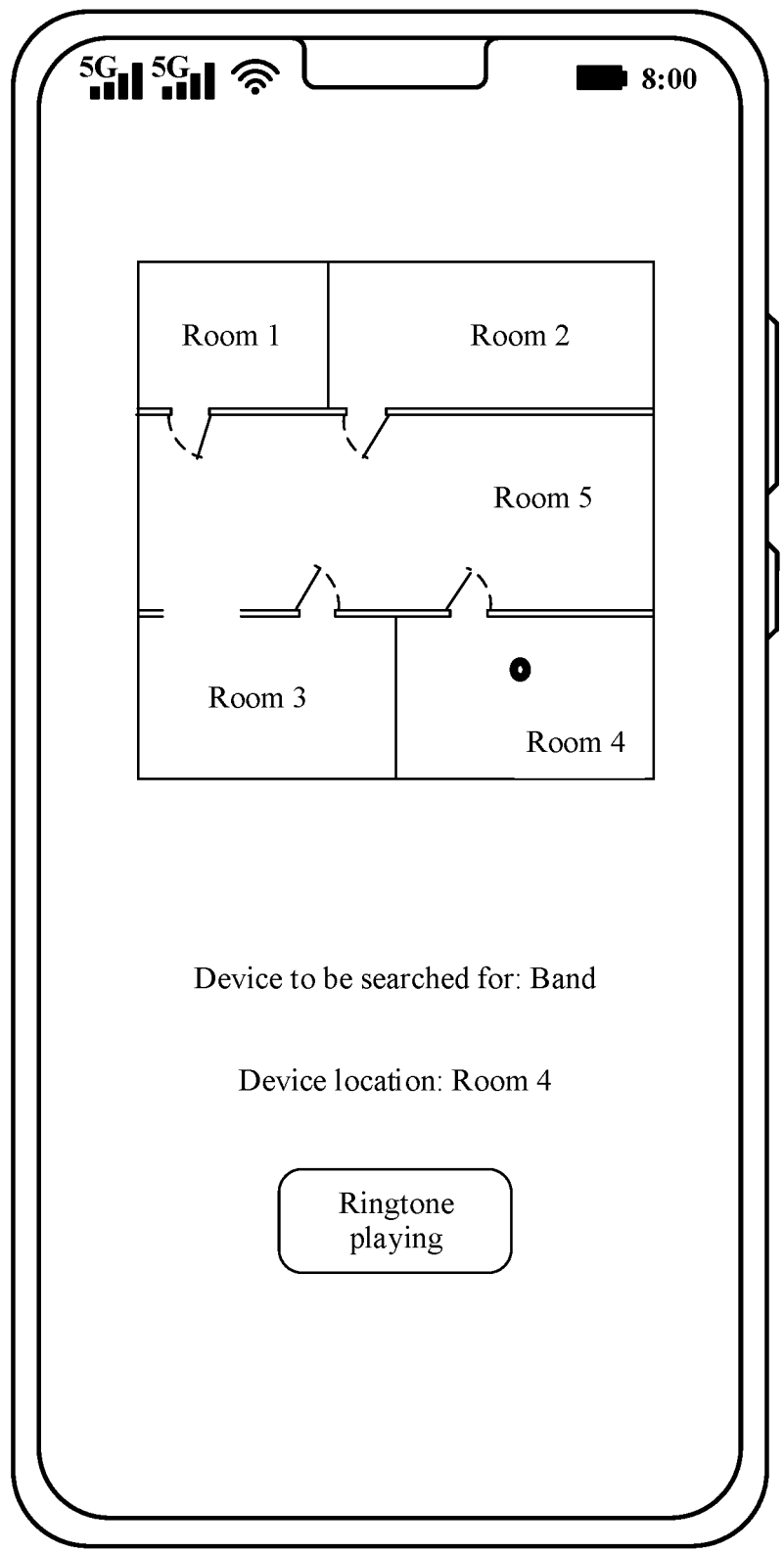
FIG. 13 is a schematic diagram of a display interface according to this application.

FIG. 13 is a schematic diagram of a display interface according to an example of this application. The display interface includes layout diagrams of all rooms in the home scenario, and the band is displayed in a room in which the band is located. For example, the band is displayed in a room 4.

In some embodiments, the display interface may further display furniture and/or another device in each room. For example, the display interface displays the band on a table of the room 4. In some other embodiments, the mobile phone may further provide a ring button on the display interface, for example, "Ringtone playing" in FIG. 13. If the user taps the ring button, the band may ring in response to the instruction, thereby helping the user quickly find the band.

Figure 14:
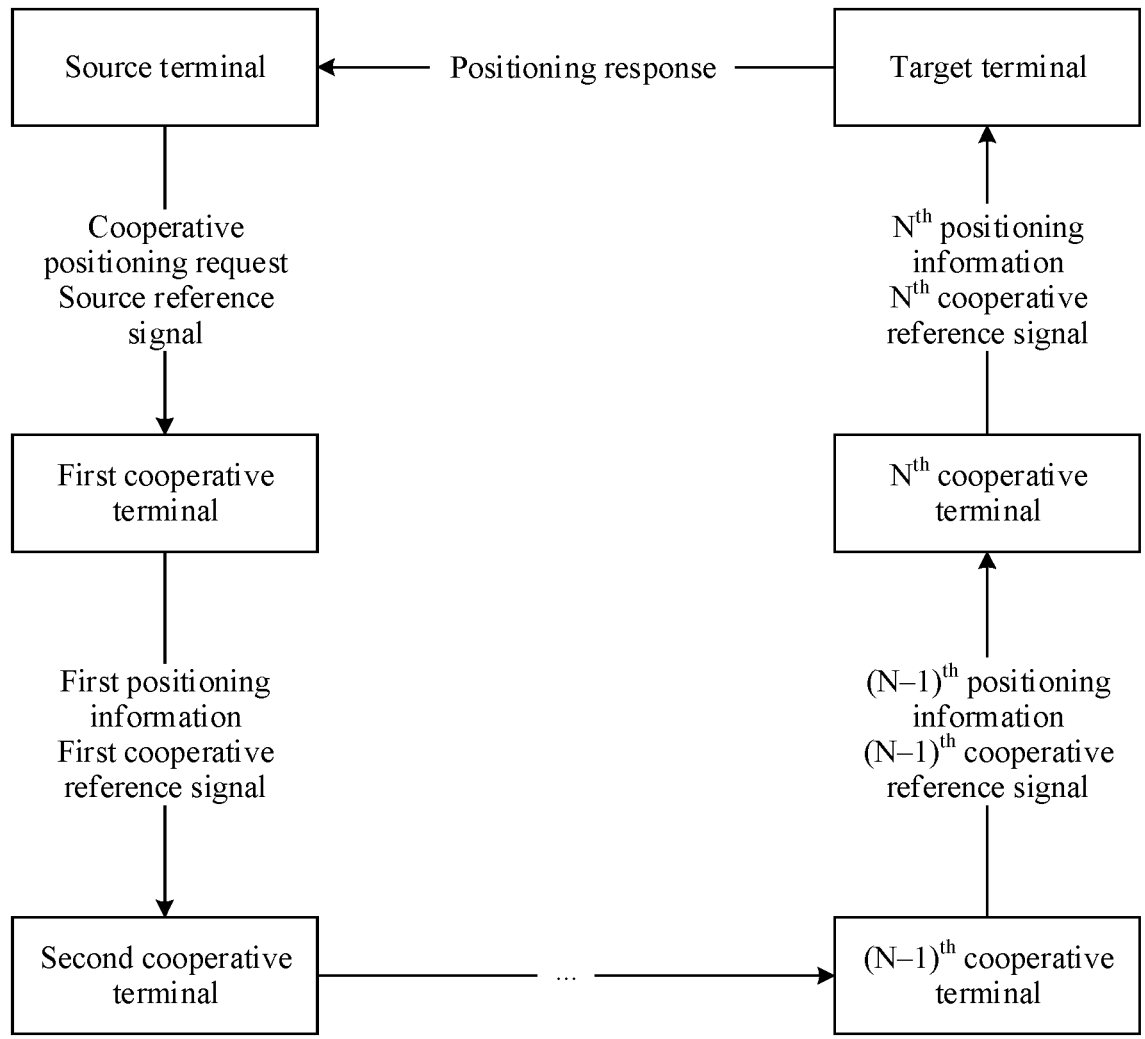
FIG. 14 is a schematic flowchart of determining target relative location information based on N cooperative terminals according to this application.

In addition, an embodiment of this application is further applicable to a cooperative positioning process including a plurality of cooperative terminals. Refer to FIG. 14. A source terminal broadcasts a cooperative positioning request and a source reference signal. A first cooperative terminal receives the cooperative positioning request from the source terminal, and in response to the cooperative positioning request, measures the source reference signal to obtain first cooperative location information between the source terminal and the first cooperative terminal.

The first cooperative terminal broadcasts the first positioning information and a first cooperative reference signal, and a second cooperative terminal receives the first positioning information from the first cooperative terminal, and in response to the first positioning information, measures the first cooperative reference signal to obtain second cooperative location information between the first cooperative terminal and the second cooperative terminal.

The second cooperative terminal broadcasts second positioning information and a second cooperative reference signal. A third cooperative terminal receives the second positioning information from the second cooperative terminal, and in response to the second positioning information, measures the second cooperative reference signal to obtain third cooperative location information between the third cooperative terminal and the second cooperative terminal.

By analogy, until $N^{th}$ cooperative terminal broadcasts $N^{th}$ positioning information and $N^{th}$ cooperative reference signal, a target terminal receives the $N^{th}$ positioning information from the $N^{th}$ cooperative terminal, and in response to the $N^{th}$ positioning information, measures the $N^{th}$ cooperative reference signal to obtain second relative location information between the $N^{th}$ cooperative terminal and the target terminal.

The target terminal determines target relative location information between the target terminal and the source terminal based on the first cooperative location information, the second cooperative location information, the third cooperative location information, . . . , $N^{th}$ cooperative location information, and the second relative location information.

The target terminal sends a positioning response to the source terminal. The positioning response includes the target relative location information between the target terminal and the source terminal.

In the foregoing technical solution, if there is no line of sight path between the source terminal and the target terminal, a cooperative terminal in a cooperative terminal group may assist the source terminal and the target terminal in determining relative location information between the source terminal and the target terminal. In the cooperative positioning process, there is no need to eliminate a non-line of sight path positioning error between the target terminal and/or the source terminal, so that complexity of the positioning process is reduced. In addition, in the entire cooperative positioning process, there is a line of sight path between two terminals that perform relative positioning, the two terminals may determine relatively accurate relative location information, and relatively accurate relative location information between the target terminal and the source terminal is determined based on a plurality of pieces of relatively accurate relative location information.

Embodiments described in this specification may be independent solutions, or may be combined based on internal logic. These solutions all fall within the protection scope of this application.

It may be understood that in the foregoing method embodiments, the methods and operations implemented by the terminal may alternatively be implemented by a component (for example, a chip or a circuit) that can be used in the terminal.

In the foregoing embodiments provided in this application, the methods provided in embodiments of this application are separately described from a perspective of interaction between devices. To implement functions in the method provided in the foregoing embodiments of this application, the terminal may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

In embodiments of this application, module division is an example, and is merely a logical function division, and may be another division during actual implementation. In addition, function modules in embodiments of this application may be integrated into one processor, or each of the modules may exist alone physically, or two or more modules are integrated into one module. The integrated module may be implemented in a form of hardware, or may be implemented in a form of a software function module.

Figure 15:
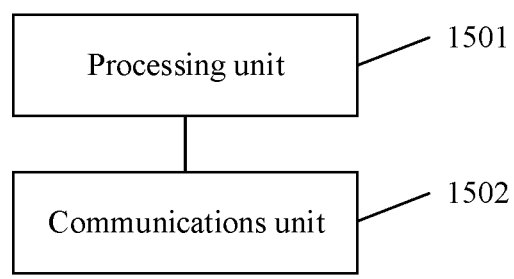
FIG. 15 is a schematic diagram of a structure of a cooperative positioning apparatus according to this application.
Figure 16:
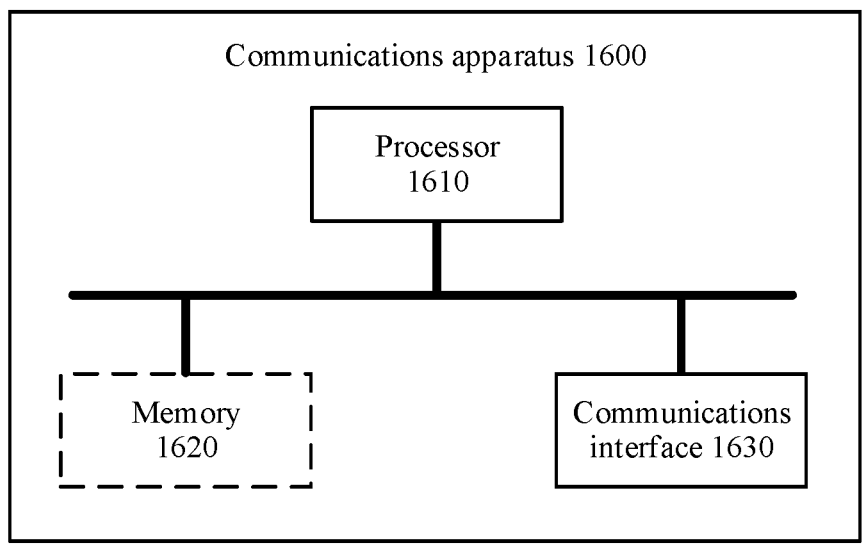
FIG. 16 is a schematic diagram of a structure of a communications apparatus according to this application.

Based on the foregoing content and a same concept, FIG. 15 and FIG. 16 each are a schematic diagram of a possible structure of a communications apparatus according to this application. The communications apparatus may be configured to implement functions of the terminal in the foregoing method embodiments, and therefore can also implement beneficial effects of the foregoing method embodiments. In this application, the communications apparatus may be the terminal shown in FIG. 1, or may be a module (for example, a chip) applied to the terminal.

As shown in FIG. 15, the communications apparatus 1500 includes a processing unit 1501 and a communications unit 1502. The communications apparatus 1500 is configured to implement functions of the terminal in the related method embodiments in FIG. 6 to FIG. 14.

In a possible design, when the communications apparatus 1500 is a terminal, for example, the communications unit 1502 may be a transceiver. The transceiver may include an antenna, a radio frequency circuit, and the like. The processing unit 1501 may be a processor (or a processing circuit), for example, a baseband processor. The baseband processor may include one or more CPUs. When the communications apparatus 1500 is a component having a function of the foregoing terminal, the communications unit 1502 may be a radio frequency unit, and the processing unit 1501 may be a processor (or a processing circuit), for example, a baseband processor. When the communications apparatus 1500 is a chip system, the communications unit 1502 may be an input/output interface of a chip (for example, a baseband chip), and the processing unit 1501 may be a processor (or a processing circuit) of the chip system, and may include one or more central processing units. It should be understood that the processing unit 1501 in this embodiment of this application may be implemented by a processor or a processor-related circuit component (or referred to as a processing circuit), and the communications unit 1502 may be implemented by a transceiver or a transceiver-related circuit component.

The method performed by the terminal in the foregoing embodiments may be implemented by a processor 1610 by invoking a program stored in a memory (which may be a memory 1620 in the terminal or may be an external memory). That is, an apparatus used for the terminal may include the processor 1610, and the processor 1610 invokes the program in the memory, to perform the method performed by the terminal in the foregoing method embodiments. The processor herein may be an integrated circuit having a signal processing capability, for example, a CPU. The apparatus used for the terminal may be implemented by one or more integrated circuits configured to implement the foregoing method, for example, one or more ASICs, one or more microprocessors DSPs, one or more FPGAs, or a combination of at least two of the integrated circuits. Alternatively, the foregoing implementations may be combined.

For another example, a function/an implementation process of the processing unit 1501 in FIG. 15 may be implemented by the processor 1610 in a communications apparatus 1600 shown in FIG. 16 by invoking computer-executable instructions stored in the memory 1620, and a function/an implementation process of the communications unit 1502 in FIG. 15 may be implemented through a communications interface 1630 in the communications apparatus 1600 shown in FIG. 16.

With reference to the foregoing descriptions, this application further provides the following embodiments.

Embodiment 1: A cooperative positioning method is provided. The method includes: A first terminal sends first information to a second terminal. The first information includes a source terminal identifier and a target terminal identifier, and the second terminal determines relative location information between the second terminal and the first terminal in response to the first information. The second terminal sends second information to a third terminal. The second information includes the relative location information between the second terminal and the first terminal, the source terminal identifier, and the target terminal identifier, and the third terminal determines relative location information between the third terminal and the second terminal in response to the second information. There is a line of sight path between the first terminal and the second terminal, and there is a line of sight path between the second terminal and the third terminal.

For example, the first terminal, the second terminal, and the third terminal are respectively the source terminal, the cooperative terminal, and the target terminal in FIG. 6 or FIG. 9, the first information is the cooperative positioning request sent by the source terminal, the second information is the positioning information sent by the cooperative terminal, and the third information is the positioning response sent by the target terminal.

For example, the first terminal, the second terminal, and the third terminal are respectively the source terminal, the first cooperative terminal, and the second cooperative terminal in FIG. 11A and FIG. 11B, or are respectively the source terminal, the first cooperative terminal, and the second cooperative terminal in FIG. 14. The first information is the cooperative positioning request sent by the source terminal, the second information is the first positioning information sent by the first cooperative terminal, and the third information is the second positioning information sent by the second cooperative terminal.

For example, the first terminal, the second terminal, and the third terminal are respectively the first cooperative terminal, the second cooperative terminal, and the target terminal in FIG. 11A and FIG. 11B, the first information is the first positioning information sent by the first cooperative terminal, the second information is the second positioning information sent by the second cooperative terminal, and the third information is the positioning response sent by the target terminal.

For example, the first terminal, the second terminal, and the third terminal are respectively an $(n-1)^{th}$ cooperative terminal, an $n^{th}$ cooperative terminal, and an $(n+1)^{th}$ cooperative terminal in FIG. 14, the first information is $(n-1)^{th}$ positioning information sent by the $(n-1)^{th}$ cooperative terminal, the second information is $n^{th}$ positioning information sent by the $n^{th}$ cooperative terminal, and the third information is $(n+1)^{th}$ positioning information sent by the $(n+1)^{th}$ cooperative terminal. Herein, n−1 is greater than or equal to 1, and n+1 is less than or equal to N.

For example, the first terminal, the second terminal, and the third terminal are respectively $(N-1)^{th}$ cooperative terminal, $N^{th}$ cooperative terminal, and a target terminal in FIG. 14, and the first information is $(N-1)^{th}$ positioning information sent by the $(N-1)^{th}$ cooperative terminal, the second information is $N^{th}$ positioning information sent by the $N^{th}$ cooperative terminal, and the third information is the positioning response sent by the target terminal.

Embodiment 2: According to the method in Embodiment 1, the first terminal is a source terminal, the second terminal is a cooperative terminal, the third terminal is a target terminal, and the method further includes: The third terminal determines relative location information between the third terminal and the first terminal based on the relative location information between the third terminal and the second terminal and the relative location information between the second terminal and the first terminal. The third terminal sends a third message to the first terminal. The third message includes the relative location information between the third terminal and the first terminal, the source terminal identifier, and the target terminal identifier.

Embodiment 3: According to the method in Embodiment 1, the first terminal is a source terminal, and both the second terminal and the third terminal are cooperative terminals; or the third terminal is a target terminal, and both the first terminal and the second terminal are cooperative terminals.

Embodiment 4: A cooperative positioning method is provided, including: A second terminal receives first information from a first terminal, and determines relative location information between the second terminal and the first terminal in response to the first information. The first information includes a source terminal identifier and a target terminal identifier. The second terminal sends second information to a third terminal. The second information includes the relative location information between the second terminal and the first terminal, the source terminal identifier, and the target terminal identifier. There is a line of sight path between the first terminal and the second terminal, and there is a line of sight path between the second terminal and the third terminal.

Embodiment 5: According to the method in Embodiment 4, the first information further includes relative location information between the first terminal and a fourth terminal, the second information further includes the relative location information between the first terminal and the fourth terminal, and there is a line of sight path between the first terminal and the fourth terminal.

Embodiment 6: According to the method in Embodiment 5, the relative location information between the first terminal and the fourth terminal includes a terminal identifier pair formed by a first terminal identifier and a fourth terminal identifier, a relative location between the first terminal and the fourth terminal, and a timestamp corresponding to the relative location between the first terminal and the fourth terminal.

Embodiment 7: According to the method in Embodiment 5 or Embodiment 6, the first information further includes preset time information. The preset time information indicates the second terminal to send the second information within a preset time period; or the preset time information indicates whether the second terminal includes the relative location information between the first terminal and the fourth terminal in the second information.

Embodiment 8: According to the method in any one of Embodiment 4 to Embodiment 7, the first information further includes indication information of a first resource, and the first resource is used to carry a relative positioning reference signal sent by the first terminal. That the second terminal determines relative location information between the second terminal and the first terminal includes: The second terminal measures, on the first resource, the relative positioning reference signal sent by the first terminal, to obtain the relative location information between the second terminal and the first terminal.

Embodiment 9: According to the method in any one of Embodiment 4 to Embodiment 7, the first information further includes a first terminal identifier. That the second terminal determines relative location information between the second terminal and the first terminal includes: The second terminal determines a first resource based on the first terminal identifier and preset configuration information of a periodic relative positioning reference signal. The first resource is used to carry a relative positioning reference signal sent by the first terminal. The second terminal measures, on the first resource, the relative positioning reference signal sent by the first terminal, to obtain the relative location information between the second terminal and the first terminal.

Embodiment 10: According to the method in any one of Embodiment 4 to Embodiment 9, the method further includes: The second terminal sends a relative positioning reference signal to the third terminal. The relative positioning reference signal sent by the second terminal is used to determine relative location information between the second terminal and the third terminal.

Embodiment 11: According to the method in any one of Embodiment 4 to Embodiment 10, the relative positioning reference signal sent by the second terminal is carried on a second resource, the second resource is selected by the second terminal from a resource pool, and the second information further includes indication information of the second resource; or the second resource is determined by the second terminal based on a second terminal identifier and preset configuration information of a periodic relative positioning reference signal, and the second information further includes the second terminal identifier.

Embodiment 12: According to the method in any one of Embodiment 4 to Embodiment 11, the first terminal is a source terminal, the second terminal is a cooperative terminal, and the third terminal is a target terminal; or the first terminal is a source terminal, and both the second terminal and the third terminal are cooperative terminals; or the third terminal is a target terminal, and both the first terminal and the second terminal are cooperative terminals.

Embodiment 13: A cooperative positioning method is provided, including: A first terminal determines first message. The first information includes a source terminal identifier and a target terminal identifier. The first terminal sends the first information to a second terminal. The first information indicates the second terminal to send second information to a third terminal. The second information includes relative location information between the second terminal and the first terminal, the source terminal identifier, and the target terminal identifier. There is a line of sight path between the first terminal and the second terminal, and there is a line of sight path between the second terminal and the third terminal.

Embodiment 14: According to the method in Embodiment 13, the first terminal is a source terminal, the second terminal is a cooperative terminal, the third terminal is a target terminal, and the method further includes: The first terminal receives a third message from the third terminal. The third message includes relative location information between the third terminal and the first terminal, the source terminal identifier, and the target terminal identifier.

Embodiment 15: A cooperative positioning method is provided, including: A third terminal receives second information from a second terminal. The second information includes relative location information between the second terminal and a first terminal, a source terminal identifier, and a target terminal identifier. The third terminal determines relative location information between the third terminal and the second terminal in response to the second information. There is a line of sight path between the first terminal and the second terminal, and there is a line of sight path between the second terminal and the third terminal.

Embodiment 16: According to the method in Embodiment 15, the first terminal is a source terminal, the second terminal is a cooperative terminal, the third terminal is a target terminal, and the method further includes: The third terminal determines relative location information between the third terminal and the first terminal based on the relative location information between the third terminal and the second terminal and the relative location information between the second terminal and the first terminal. The third terminal sends a third message to the first terminal. The third message includes the relative location information between the third terminal and the first terminal, the source terminal identifier, and the target terminal identifier.

Embodiment 17: A cooperative positioning apparatus is provided, including a processing unit and a communications unit. The processing unit is configured to control the communications unit to receive first information from a first terminal, and determine relative location information between the apparatus and the first terminal in response to the first information. The first information includes a source terminal identifier and a target terminal identifier. The processing unit is further configured to control the communications unit to send second information to a third terminal. The second information includes the relative location information between the apparatus and the first terminal, the source terminal identifier, and the target terminal identifier. There is a line of sight path between the first terminal and the apparatus, and there is a line of sight path between the apparatus and the third terminal.

Embodiment 18: According to the apparatus in Embodiment 17, the first information further includes relative location information between the first terminal and a fourth terminal, the second information further includes the relative location information between the first terminal and the fourth terminal, and there is a line of sight path between the first terminal and the fourth terminal.

Embodiment 19: According to the apparatus in Embodiment 18, the relative location information between the first terminal and the fourth terminal includes a terminal identifier pair formed by a first terminal identifier and a fourth terminal identifier, a relative location between the first terminal and the fourth terminal, and a timestamp corresponding to the relative location between the first terminal and the fourth terminal.

Embodiment 20: According to the apparatus in either of Embodiment 18 and Embodiment 19, the first information further includes preset time information. The preset time information indicates the processing unit to the communications unit to send the second information within a preset time period; or the preset time information indicates the processing unit whether to include the relative location information between the first terminal and the fourth terminal in the second information.

Embodiment 21: According to the apparatus in any one of Embodiment 17 to Embodiment 20, the first information further includes indication information of a first resource, and the first resource is used to carry a relative positioning reference signal sent by the first terminal. The processing unit is specifically configured to measure, on the first resource, the relative positioning reference signal sent by the first terminal, to obtain the relative location information between the apparatus and the first terminal.

Embodiment 22: According to the apparatus in any one of Embodiment 17 to Embodiment 20, the first information further includes a first terminal identifier. The processing unit is specifically configured to determine a first resource based on the first terminal identifier and preset configuration information of a periodic relative positioning reference signal. The first resource is used to carry the relative positioning reference signal sent by the first terminal, and measure, on the first resource, the relative positioning reference signal sent by the first terminal, to obtain the relative location information between the apparatus and the first terminal.

Embodiment 23: According to the apparatus in any one of Embodiment 17 to Embodiment 22, the processing unit is further configured to control the communications unit to send a relative positioning reference signal to the third terminal, and the relative positioning reference signal sent by the communications unit is used to determine relative location information between the apparatus and the third terminal.

Embodiment 24: According to the apparatus in any one of Embodiment 17 to Embodiment 23, the relative positioning reference signal sent by the communications unit is carried on a second resource, the second resource is selected by the processing unit from a resource pool, and the second information further includes indication information of the second resource; or the second resource is determined by the processing unit based on an apparatus identifier and preset configuration information of a periodic relative positioning reference signal, and the second information further includes the apparatus identifier.

Embodiment 25: According to the apparatus in any one of Embodiment 17 to Embodiment 24, the first terminal is a source terminal, the apparatus is a cooperative terminal, and the third terminal is a target terminal; or the first terminal is a source terminal, and both the apparatus and the third terminal are cooperative terminals; or the third terminal is a target terminal, and both the first terminal and the apparatus are cooperative terminals.

Embodiment 26: A cooperative positioning apparatus is provided, including a processing unit and a communications unit. The processing unit is configured to determine first message. The first information includes a source terminal identifier and a target terminal identifier. The processing unit is further configured to control the communications unit to send the first information to a second terminal. The first information indicates the second terminal to send second information to a third terminal. The second information includes relative location information between the second terminal and the apparatus, the source terminal identifier, and the target terminal identifier. There is a line of sight path between the apparatus and the second terminal, and there is a line of sight path between the second terminal and the third terminal.

Embodiment 27: According to the apparatus in Embodiment 26, the apparatus is a source terminal, a second terminal is a cooperative terminal, a third terminal is a target terminal. The processing unit is further configured to control the communications unit to receive a third message from the third terminal. The third message includes relative location information between the third terminal and the apparatus, the source terminal identifier, and the target terminal identifier.

Embodiment 28: A cooperative positioning apparatus is provided, including a processing unit and a communications unit. The processing unit is configured to: control the communications unit to receive second information from a second terminal, and the second information includes relative location information between the second terminal and a first terminal, a source terminal identifier, and a target terminal identifier; and determine relative location information between the apparatus and the second terminal in response to the second information. There is a line of sight path between the first terminal and the second terminal, and there is a line of sight path between the second terminal and the apparatus.

Embodiment 29: According to the apparatus in Embodiment 28, the first terminal is a source terminal, the second terminal is a cooperative terminal, the apparatus is a target terminal. The processing unit is further configured to determine relative location information between the apparatus and the first terminal based on the relative location information between the apparatus and the second terminal and the relative location information between the second terminal and the first terminal. The processing unit is further configured to control the communications unit to send a third message to the first terminal. The third message includes relative location information between the third terminal and the first terminal, the source terminal identifier, and the target terminal identifier.

Embodiment 30: A communications apparatus is provided, including a processor and a memory. The processor and the memory are coupled, the memory is configured to store computer program instructions, and when the processor executes the computer program instructions, the communications apparatus is enabled to perform the method in any one of Embodiment 4 to Embodiment 12, or the communications apparatus is enabled to perform the method in Embodiment 13 or Embodiment 14, or the communications apparatus is enabled to perform the method in Embodiment 15 or Embodiment 16.

Embodiment 31: A computer-readable storage medium is provided. The computer-readable storage medium includes computer instructions, and when the computer instructions run on a computer, the computer is enabled to perform the method in any one of Embodiment 4 to Embodiment 12, or the computer is enabled to perform the method in Embodiment 13 or Embodiment 14, or the computer is enabled to perform the method in Embodiment 15 or Embodiment 16.

Embodiment 32: A chip is provided, including a processor. When the processor executes instructions, the processor performs the method in any one of Embodiment 4 to Embodiment 12, or the processor performs the method in Embodiment 13 or Embodiment 14, or the processor performs the method in Embodiment 15 or Embodiment 16.

Embodiment 33: A computer program product including instructions is provided. When the computer program product runs on a computer, the computer is enabled to perform the method in any one of Embodiment 4 to Embodiment 12, or the computer is enabled to perform the method in Embodiment 13 or Embodiment 14, or the computer is enabled to perform the method in Embodiment 15 or Embodiment 16.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. "And/or" describes an association relationship between associated objects, and indicates that three relationships may exist. For example, A and/or B may indicate the following three cases: A exists alone, both A and B exist, and B exists alone, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A cooperative positioning method, comprising:
receiving, by a second terminal from a first terminal, a cooperative positioning request that includes first information comprising a source terminal identifier and a target terminal identifier;
determining, by the second terminal in response to the cooperative positioning request including the first information, relative location information between the second terminal and the first terminal by measuring a first reference signal sent by the first terminal; and
sending, by the second terminal, second information to a third terminal, wherein the second information comprises the relative location information between the second terminal and the first terminal, the source terminal identifier, and the target terminal identifier, wherein the second information is provided to the third terminal for location information determination.

2. The method according to claim 1, wherein the first terminal is a source terminal, and both the second terminal and the third terminal are cooperative terminals; or
the third terminal is a target terminal, and both the first terminal and the second terminal are cooperative terminals.

3. The method according to claim 1, wherein the first information further comprises relative location information between the first terminal and a fourth terminal, the second information further comprises the relative location information between the first terminal and the fourth terminal.

4. The method according to claim 3, wherein the relative location information between the first terminal and the fourth terminal comprises a terminal identifier pair comprising a first terminal identifier and a fourth terminal identifier, a relative location between the first terminal and the fourth terminal, and a timestamp corresponding to the relative location between the first terminal and the fourth terminal.

5. The method according to claim 3, wherein the first information further comprises preset time information, wherein
the preset time information indicates the second terminal to send the second information within a preset time period; or
the preset time information indicates whether the second terminal includes the relative location information between the first terminal and the fourth terminal in the second information.

6. The method according to claim 1, wherein the first information further comprises indication information of a first resource, and the first resource is used to carry the first reference signal sent by the first terminal.

7. The method according to claim 1, wherein the first information further comprises a first terminal identifier; and
the determining, by the second terminal, the relative location information between the second terminal and the first terminal by measuring the first reference signal sent by the first terminal comprises:
determining, by the second terminal, a first resource based on the first terminal identifier and preset configuration information of a periodic relative positioning reference signal, wherein the first resource is used to carry the first reference signal sent by the first terminal; and
measuring, by the second terminal on the first resource, the first reference signal sent by the first terminal, to obtain the relative location information between the second terminal and the first terminal.

8. The method according to claim 1, wherein the method further comprises:
sending, by the second terminal, a second reference signal to the third terminal, wherein the second reference signal sent by the second terminal is used to determine relative location information between the second terminal and the third terminal.

9. The method according to claim 8, wherein the second reference signal sent by the second terminal is carried on a second resource, the second resource is selected by the second terminal from a resource pool, and the second information further comprises indication information of the second resource; or the second resource is determined by the second terminal based on a second terminal identifier and preset configuration information of a periodic relative positioning reference signal, and the second information further comprises the second terminal identifier.

10. The method according to claim 1, wherein the first terminal is a source terminal, the second terminal is a cooperative terminal, and the third terminal is a target terminal;
the first terminal is a source terminal, and both the second terminal and the third terminal are cooperative terminals; or
the third terminal is a target terminal, and both the first terminal and the second terminal are cooperative terminals.

11. A communication apparatus, comprising:
a processor; and
a memory coupled to the processor and configured to store a computer program, the computer program comprising instructions that, when executed by the process, cause the communication apparatus to perform the operations:
receiving first information from a first terminal, the first information comprising a source terminal identifier and a target terminal identifier;

determining relative location information between a second terminal and the first terminal in response to the first information; and sending second information to a third terminal, wherein the second information comprises the relative location information between the second terminal and the first terminal, the source terminal identifier, and the target terminal identifier.

12. The communications apparatus according to claim 11, wherein the first information further comprises relative location information between the first terminal and a fourth terminal, the second information further comprises the relative location information between the first terminal and the fourth terminal.

13. The communications apparatus according to claim 12, wherein the relative location information between the first terminal and the fourth terminal comprises a terminal identifier pair comprising a first terminal identifier and a fourth terminal identifier, a relative location between the first terminal and the fourth terminal, and a timestamp corresponding to the relative location between the first terminal and the fourth terminal.

14. The communications apparatus according to claim 12, wherein the first information further comprises preset time information, wherein
the preset time information indicates the second terminal to send the second information within a preset time period; or
the preset time information indicates whether the second terminal includes the relative location information between the first terminal and the fourth terminal in the second information.

15. The communications apparatus according to claim 11, wherein the first information further comprises indication information of a first resource, and the first resource is used to carry a relative positioning reference signal sent by the first terminal; and
the determining the relative location information between the second terminal and the first terminal comprises:
measuring on the first resource, the relative positioning reference signal sent by the first terminal, to obtain the relative location information between the second terminal and the first terminal.

16. The communications apparatus according to claim 11, wherein the first information further comprises a first terminal identifier; and
the determining the relative location information between the second terminal and the first terminal comprises:
determining a first resource based on the first terminal identifier and preset configuration information of a periodic relative positioning reference signal, wherein the first resource is used to carry a relative positioning reference signal sent by the first terminal; and
measuring on the first resource, the relative positioning reference signal sent by the first terminal, to obtain the relative location information between the second terminal and the first terminal.

17. The communications apparatus according to claim 11, wherein the computer program comprising instructions that, when executed by the process, cause the communication apparatus to perform the operations:
sending a relative positioning reference signal to the third terminal, wherein the relative positioning reference signal sent by the second terminal is used to determine relative location information between the second terminal and the third terminal.

18. The communications apparatus according to claim 17, wherein the relative positioning reference signal sent by the second terminal is carried on a second resource, the second resource is selected by the second terminal from a resource pool, and the second information further comprises indication information of the second resource; or the second resource is determined by the second terminal based on a second terminal identifier and preset configuration information of a periodic relative positioning reference signal, and the second information further comprises the second terminal identifier.

19. A communication apparatus, comprising:
a processor; and
a memory coupled to the processor and configured to store a computer program, the computer program comprising instructions that, when executed by the process, cause the communication apparatus to perform the following operations:
receiving, from a second terminal, first information comprising a source terminal identifier, a target terminal identifier, and first cooperative location information, wherein the first cooperative location information comprises first relative location information between a first terminal and the second terminal and a first terminal identifier pair corresponding to the first relative location information;
determining second relative location information between a third terminal and the second terminal based on the first information; and
sending second information comprising the source terminal identifier, the target terminal identifier, the first cooperative location information and second cooperative location information, wherein the second cooperative location information comprises the second relative location information between the third terminal and the second terminal and a second terminal identifier pair corresponding to the second relative location information.

20. A communication apparatus, comprising:
a processor; and
a memory coupled to the processor and configured to store a computer program, the computer program comprising instructions that, when executed by the process, cause the communication apparatus to perform the following operations:
receiving, from a first terminal, first information comprising a source terminal identifier, a target terminal identifier, and one or more pieces of cooperative location information, wherein each of the one or more pieces of cooperative location information comprises a terminal identifier pair and relative location information between two terminals identified by the terminal identifier pair;
determining second relative location information between a target terminal and a resource terminal based on the source terminal identifier, the target terminal identifier, and the one or more pieces of cooperative location information; and
sending second information comprising the second relative location information between the target terminal and the resource terminal.

* * * * *